(12) United States Patent
Buermann et al.

(10) Patent No.: US 8,446,573 B1
(45) Date of Patent: May 21, 2013

(54) FOCUSING METHODS AND OPTICAL SYSTEMS AND ASSEMBLIES USING THE SAME

(71) Applicant: Illumina, Inc., San Diego, CA (US)

(72) Inventors: Dale Buermann, San Diego, CA (US); Alexander P. Kindwall, Pleasanton, CA (US)

(73) Assignee: Illumina, Inc., San Diego, CA (US)

( * ) Notice: Subject to any disclaimer, the term of this patent is extended or adjusted under 35 U.S.C. 154(b) by 0 days.

(21) Appl. No.: 13/765,158

(22) Filed: Feb. 12, 2013

Related U.S. Application Data

(62) Division of application No. 12/947,367, filed on Nov. 16, 2010.

(60) Provisional application No. 61/300,300, filed on Feb. 1, 2010.

(51) Int. Cl.
*G01C 3/08* (2006.01)
*G01B 11/24* (2006.01)
*G01B 11/30* (2006.01)

(52) U.S. Cl.
USPC ............. 356/5.1; 356/601; 356/603; 356/609

(58) Field of Classification Search
USPC ..... 356/237.1–241.6, 242.1–243.8, 426–431, 356/600–640
See application file for complete search history.

(56) References Cited

U.S. PATENT DOCUMENTS

| | | | |
|---|---|---|---|
| 4,483,618 A * | 11/1984 | Hamar | 356/400 |
| 4,845,352 A | 7/1989 | Benschop | |
| 5,136,149 A | 8/1992 | Fujiwara | |
| 5,298,976 A * | 3/1994 | Shahar et al. | 356/623 |
| 5,311,288 A | 5/1994 | Shahar | |
| 5,317,142 A * | 5/1994 | Noda et al. | 250/201.4 |
| 5,400,093 A * | 3/1995 | Timmers | 353/101 |
| 6,323,949 B1 | 11/2001 | Lading | |

(Continued)

FOREIGN PATENT DOCUMENTS

| | | |
|---|---|---|
| EP | 0750891 | 1/1997 |
| EP | 1333304 | 8/2003 |
| EP | 2110696 | 10/2009 |
| WO | 2008032100 | 3/2008 |

OTHER PUBLICATIONS

International Search Report and Written Opinion of PCT/US, dated Feb. 16, 2011, 10 pgs.

(Continued)

*Primary Examiner* — Gregory J Toatley
*Assistant Examiner* — Jarreas C Underwood
(74) *Attorney, Agent, or Firm* — The Small Patent Law Group LLC; Dean Small; Jason P. Gross

(57) ABSTRACT

A method for controlling focus of an optical system. The method includes providing a pair of incident light beams to a conjugate lens. The incident light beams are directed by the lens to converge toward a focal region. The method also includes reflecting the incident light beams with an object positioned proximate to the focal region. The reflected light beams return to and propagate through the lens. The method also includes detecting a phase of each of the reflected light beams and determining a degree-of-focus of the optical system with respect to the object by comparing the phases of the reflected light beams.

20 Claims, 16 Drawing Sheets

U.S. PATENT DOCUMENTS

| | | |
|---|---|---|
| 6,400,487 B1 | 6/2002 | Harris |
| 6,428,171 B1 * | 8/2002 | Aoki et al. .................... 356/634 |
| 6,649,893 B2 * | 11/2003 | Fujimoto et al. ........... 250/201.2 |
| 6,677,565 B1 | 1/2004 | Wahl |
| 7,170,597 B1 | 1/2007 | Rushbrooke et al. |
| 7,312,866 B2 * | 12/2007 | Fashant et al. ............. 356/237.5 |
| 7,339,148 B2 | 3/2008 | Kawano |
| 7,342,219 B2 | 3/2008 | Araya |
| 7,435,927 B2 | 10/2008 | Bruland |
| 7,498,551 B2 | 3/2009 | Werner |
| 7,589,315 B2 | 9/2009 | Feng |
| 7,915,584 B2 * | 3/2011 | Tiemeijer et al. ............. 250/310 |
| 2003/0147134 A1 | 8/2003 | Cemic |
| 2004/0090667 A1 * | 5/2004 | Gartner et al. ................ 359/368 |
| 2005/0270611 A1 | 12/2005 | Oshiro |
| 2007/0262232 A1 * | 11/2007 | Sander ....................... 250/201.3 |
| 2008/0135724 A1 | 6/2008 | Hsu |

OTHER PUBLICATIONS

Sequencing Technology Summit Agenda & PowerPoint document presented on Jan. 11, 2010, 24 pgs.

International Preliminary Report on Patentability of PCT/US2010/056844, dated Jul. 9, 2012; 7 pgs.

* cited by examiner

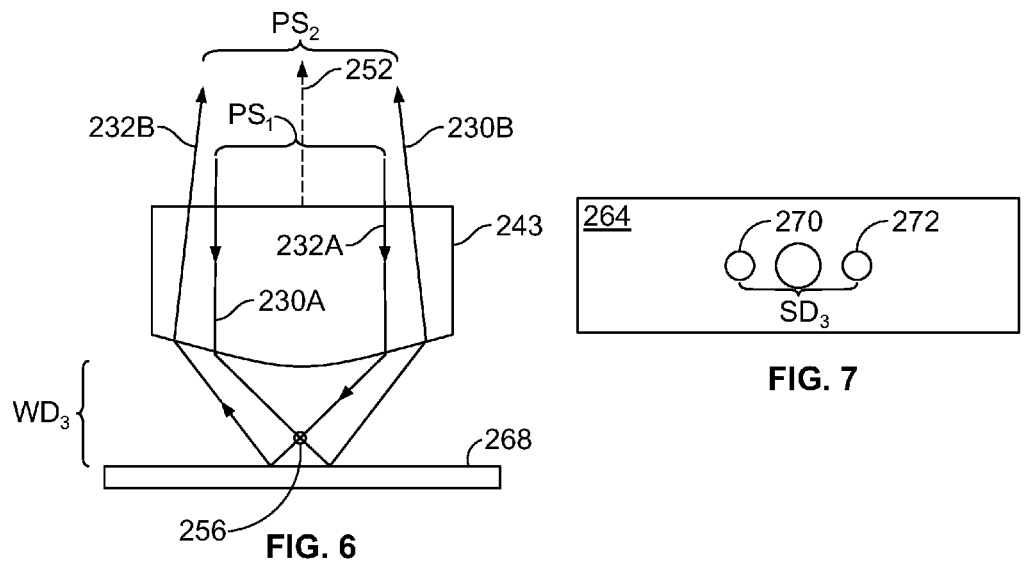
FIG. 6
FIG. 7
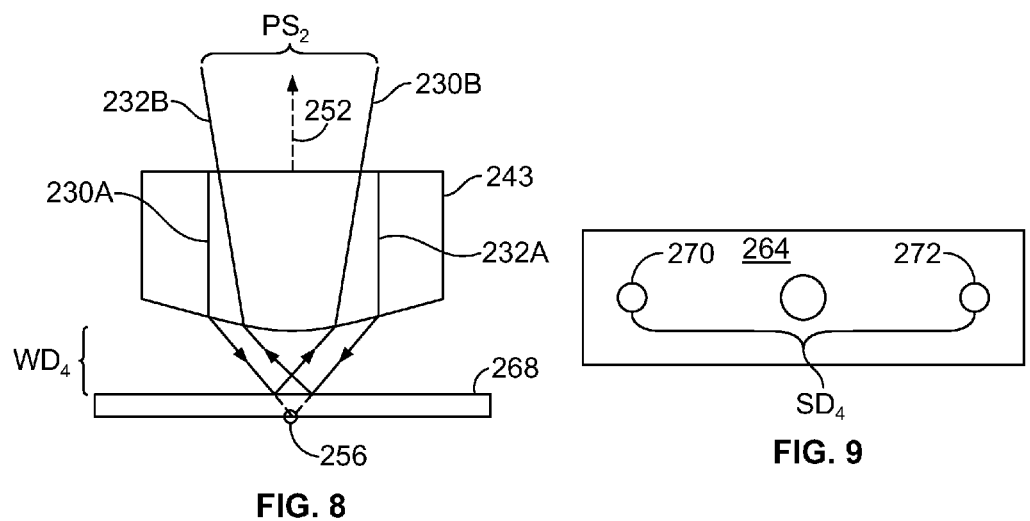
FIG. 8
FIG. 9

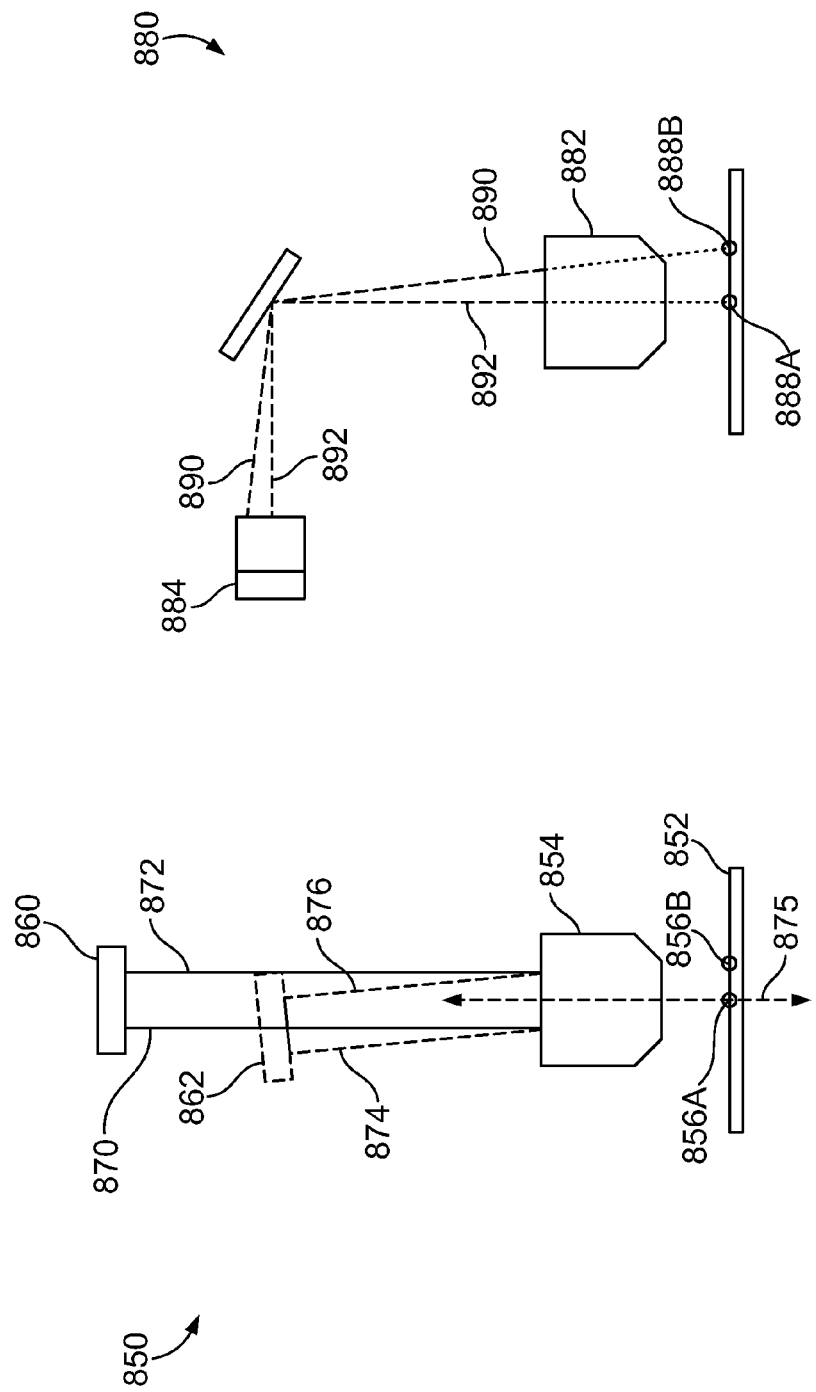

FOCUSING METHODS AND OPTICAL SYSTEMS AND ASSEMBLIES USING THE SAME

CROSS-REFERENCES TO RELATED APPLICATIONS

The present application is a divisional of U.S. application Ser. No. 12/947,367, filed Nov. 16, 2010 and entitled "Focusing Methods and Optical Systems and Assemblies Using the Same," which claims the benefit of U.S. Provisional Application No. 61/300,300, filed Feb. 1, 2010 and entitled "Focusing Methods and Optical Systems and Assemblies Using the Same." Each of the above applications is incorporated by reference in its entirety.

BACKGROUND OF THE INVENTION

Embodiments of the present invention relate generally to optical systems and assemblies, and more specifically to focusing methods for microscopic optical systems and assemblies.

A wide variety of microscopic optical systems exist that observe a sample of interest comprising biological or chemical substances. For example, sample imagers may be configured to detect activity that is indicative of a desired reaction (e.g., binding events between targets and probes). Such activity may be identified by detecting light emissions (e.g., fluorescence or chemiluminescence) from labels that are selectively bound to the targets or probes. The detected light is then analyzed to determine properties or characteristics of the biological or chemical substances. Other microscopic optical systems exist that are configured to inspect an object to determine certain features or structures of the object. For example, optical systems may be used to inspect a surface of a semiconductor chip or silicon wafer to determine whether there are any deviations or defects in a pattern on the surface. Other optical systems include profilometers that determine surface profiles of an object.

Conventional optical systems, such as those described above, generally include a focus-control system that determines whether the optical system has an acceptable degree-of-focus with respect to the object. For example, some conventional optical systems use a focusing method that includes reflecting a reference light beam off a surface of the object and detecting the reflected light beam with a detector (e.g., position-sensitive detector (PSD)). The reflected light beam forms a beam spot on a surface of the detector. If the beam spot is offset by a certain amount from a desired location on the surface or if the beam spot has a certain morphology (e.g., size, shape, and/or density), the focus-control system may determine that the optical system is not properly focused and may adjust the object or the optical components of the system accordingly.

However, the focus-control systems of such conventional optical systems have certain limitations. Focus-control systems often include several optical components that affect the optical path of the reference light beam before and after the light beam is reflected by the object. If any one of these optical components is somehow moved from a predetermined position during operation of the optical system or somehow adversely affected, the beam spot will not provide accurate information relating to the focus of the system. Such problems may not be identified until after an object is scanned thereby requiring the use of sub-standard data or possibly requiring another scan. In some cases, acquisition of another scan may not be possible and a valuable sample can end up being wasted. It may also be necessary to recalibrate the optical components of the focus-control system, which may take substantial time and costs to remedy. Sub-standard data, loss of samples, or time wasted in obtaining data can be particularly problematic in diagnostic or prognostic applications where samples are often scarce and the data provides information that is important in determining a course of treatment for a patient.

In addition to the above, conventional optical systems may use complex beam-spot analysis algorithms to analyze the location, shape, and density of the beam spot. Such analysis may be costly and also sensitive to the configuration of the optical components.

Accordingly, there is a need for focusing methods and focus-control systems that reduce the alignment sensitivity of the optical components. Furthermore, there is a need for focus-control systems that use alternative forms of beam-spot analysis. There is also a general need for improved focusing methods and focus-control systems that are simpler, more accurate, and/or less costly than known focusing methods and focus-control systems.

BRIEF DESCRIPTION OF THE INVENTION

In accordance with one embodiment, a method for controlling a focus of an optical system is provided. The method includes providing a pair of incident light beams to a conjugate lens. The incident light beams are directed by the lens to converge toward a focal region. The method also includes reflecting the incident light beams with an object positioned proximate to the focal region. The reflected light beams return to and propagate through the lens. The method further includes determining a relative separation between the reflected light beams and determining a degree-of-focus of the optical system with respect to the object based upon the relative separation. The method can be particularly useful for an optical system that is configured for biological or chemical analysis, for example, at microscopic resolution.

In another embodiment, an optical system is provided. The imager includes a light source that is configured to provide a pair of incident light beams and a conjugate lens positioned to receive the incident light beams. The lens directs the incident light beams toward a focal region. The imager also includes an object holder that is configured to hold an object with respect to the focal region. The object reflects the incident light beams so that the reflected light beams return to and propagate through the lens. The imager also includes a focus-control system that is configured to determine a relative separation between the reflected light beams and determine a degree-of-focus based upon the relative separation. The imager can be configured for biological or chemical analysis, for example, at microscopic resolution.

In yet another embodiment, a method for controlling a focus of an optical system is provided. The method includes providing a pair of incident light beams to a conjugate lens. The incident light beams are directed by the lens to converge toward a focal region. The method also includes reflecting the incident light beams with an object that is positioned proximate to the focal region. The reflected light beams return to and propagating through the lens. The method also includes determining a phase of each of the reflected light beams and determining a degree-of-focus of the optical system with respect to the sample by comparing the phases of the reflected light beams. The method can be particularly useful for a sample imager that is configured for biological or chemical analysis, for example, at microscopic resolution.

In a further embodiment, an optical system is provided. The imager includes a light source that is configured to provide a pair of incident light beams and a conjugate lens that is positioned to receive the incident light beams. The lens directs the incident light beams toward a focal region. The optical system also includes an object holder that is configured to hold an object with respect to the focal region. The sample reflects the incident light beams so that the reflected light beams return to and propagate through the lens. The imager also includes a focus-control system that is configured to determine a phase of each of the reflected light beams and determine a degree-of-focus by comparing the phases of the reflected light beams. The imager can be configured for biological or chemical analysis, for example, at microscopic resolution.

Also provided is a method for determining distance of an object from a lens. The method includes providing a pair of incident light beams to a conjugate lens. The incident light beams are directed by the lens to converge toward a focal region. The method also includes reflecting the incident light beams with an object positioned at a working distance proximate to the focal region. The reflected light beams return to and propagate through the lens. The method further includes determining a separation distance measured between the reflected light beams and determining the working distance between the object and the lens based upon the separation distance. The method can be particularly useful for a sample imager that is configured for biological or chemical analysis, for example, at microscopic resolution.

In another embodiment, a sample imager is provided. The imager includes a light source that is configured to provide a pair of incident light beams and a conjugate lens positioned to receive the incident light beams 1. The lens directs the incident light beams to a focal region. The imager also includes a sample holder that is configured to hold a sample at a working distance from the lens. The sample reflects the incident light beams so that the reflected light beams return to and propagate through the lens. The imager also includes a system that is configured to determine a separation distance measured between the reflected light beams and determine the working distance based upon the separation distance. The sample imager can be configured for a variety of samples or objects including, for example, those used in biological or chemical analyses. The imager can be configured for microscopic resolution.

In yet another embodiment, a method for determining distance of an object from a lens is provided. The method includes providing a pair of incident light beams to a conjugate lens. The incident light beams are directed by the lens to converge toward a focal region. The method also includes reflecting the incident light beams with an object that is positioned at a working distance proximate to the focal region. The reflected light beams return to and propagating through the lens. The method also includes determining a phase of each of the reflected light beams and determining the working distance by comparing the phases of the reflected light beams. The method can be particularly useful for a sample imager that is configured for biological or chemical analysis, for example, at microscopic resolution.

In a further embodiment, a sample imager is provided. The imager includes a light source that is configured to provide a pair of incident light beams and a conjugate lens that is positioned to receive the incident light beams. The lens directs the incident light beams to a focal region. The sample imager also includes a sample holder that is configured to hold a sample with respect to the focal region. The sample reflects the incident light beams so that the reflected light beams return to and propagate through the lens. The imager also includes a system that is configured to determine a phase of each of the reflected light beams and determine the working distance by comparing the phases of the reflected light beams. The sample imager can be configured for a variety of samples or objects including, for example, those used in biological or chemical analyses. The imager can be configured for microscopic resolution.

In another embodiment, a method of determining a profile of an object surface is provided. The method includes providing a pair of incident light beams to a conjugate lens. The incident light beams are directed by the lens to converge toward a focal region. The method also includes reflecting the incident light beams with an object surface of an object that is positioned at a working distance from the lens proximate to the focal region. The reflected light beams returning to and propagating through the lens. The method also includes monitoring relative separation between the reflected light beams while scanning the object surface. The relative separation changes when the working distance changes. The method also includes determining a profile of the object surface based upon the relative separation monitored along the object surface. The method can be particularly useful for an optical system, such as a profilometer, that determines a surface profile of an object.

In another embodiment, a method for controlling a focus of an optical system is provided. The method includes providing first and second parallel incident light beams to a conjugate lens. The incident light beams are directed by the lens to converge toward a focal region. The method also includes reflecting the incident light beams with an object positioned proximate to the focal region. The reflected light beams return to and propagate through the lens. The incident light beams have a projection relationship. The method also includes reflecting the first and second light beams with a plurality of optical components configured to maintain the projection relationship of the incident light beams.

In another embodiment, a method of determining an angle of an object surface is provided. The method includes providing at least two pairs of incident light beams to a conjugate lens. A first pair of incident light beams are directed by the lens to converge toward a first focal region and a second pair of incident light beams are directed by the lens to converge toward a second focal region. The method also includes reflecting the at least two pairs of incident light beams with an object surface of an object that is positioned at a working distance from the lens proximate to the first focal region and the second focal region. A first pair of reflected light beams and a second pair of reflected light beams return to and propagate through the lens. The method also includes determining relative separation between the first pair of reflected light beams and determining relative separation between the second pair of reflected light beams. The relative separation changing when the working distance changes. The method further includes determining the angle of the object surface based upon the relative separation between the first pair of reflected light beams and based upon the relative separation between the second pair of reflected light beams.

BRIEF DESCRIPTION OF THE DRAWINGS

FIG. 6 illustrates incident and reflected light beams when the optical assembly shown in FIG. 2 is below focus.

FIG. 7 illustrates beam spots on a detector surface that are provided by the reflected light beams shown in FIG. 6.

FIG. 8 illustrates incident and reflected light beams when the optical assembly shown in FIG. 2 is above focus.

FIG. 9 illustrates beam spots on a detector surface that are provided by the reflected light beams shown in FIG. 8.

FIGS. 16A and 16B are schematic diagrams of optical assemblies that may be formed in accordance with alternative embodiments.

DETAILED DESCRIPTION OF THE INVENTION

Figure 1:
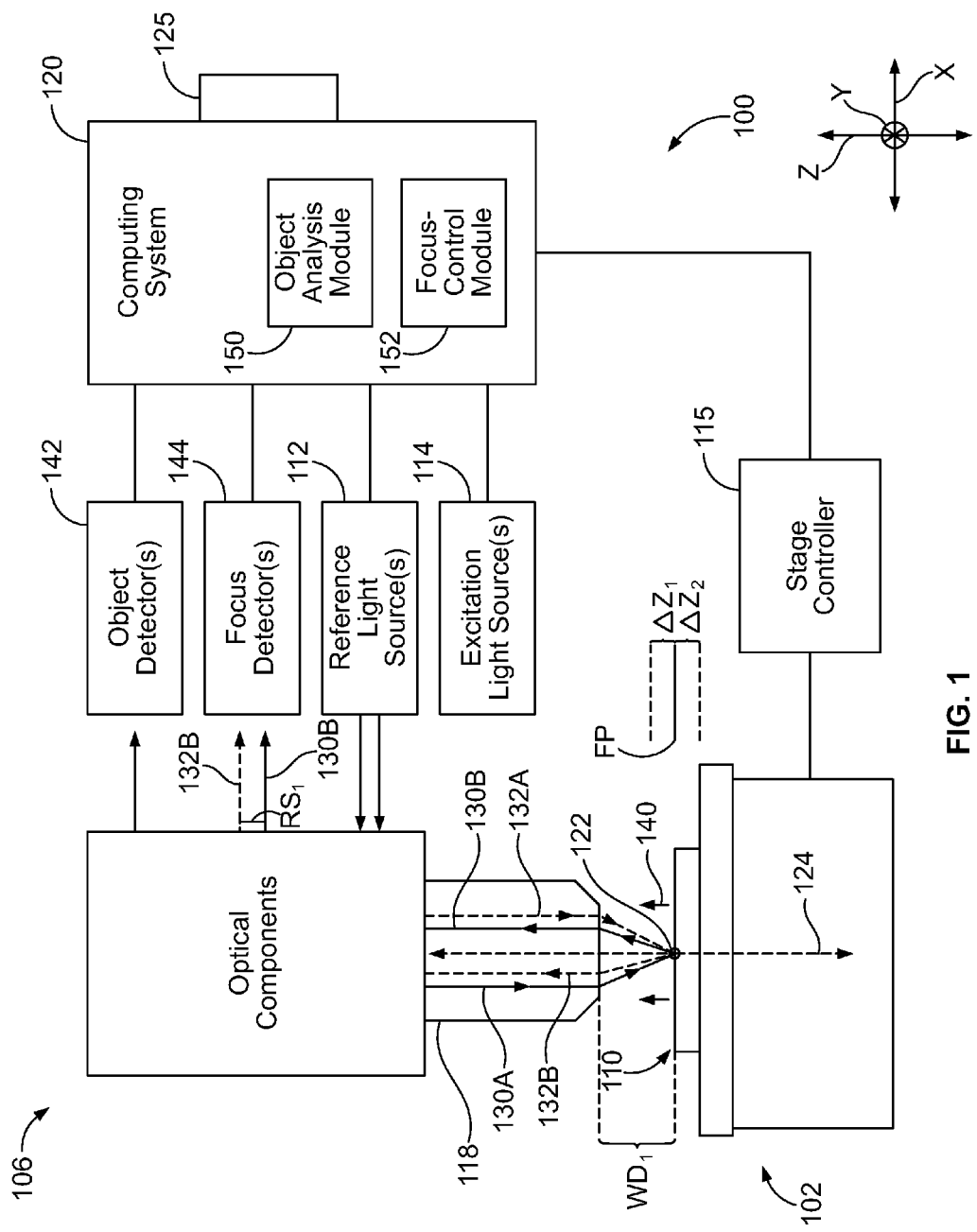
FIG. 1 illustrates a block diagram of an optical system formed in accordance with an embodiment.

Embodiments described herein include optical systems that may be used to at least one of view, image, and inspect various objects. In some embodiments, the optical systems include sample imagers that are used to image samples for biological or chemical analysis. For example, a sample imager may be configured to perform at least one of total-internal-reflectance-fluorescence (TIRF) imaging and epi-fluorescent imaging. In particular embodiments, the sample imager is a scanning time-delay integration (TDI) system. In other embodiments, the optical systems may be configured to inspect surfaces of microdevices, such as semi-conductor chips or silicon wafers, to determine if the surfaces have any deviations or defects. In other embodiments, the optical systems include profilometers that are configured to determine a surface profile or topography of an object.

In various embodiments, the optical systems can include a conjugate lens that receives one or more pairs of parallel incident light beams. The conjugate lens can direct the incident light beams to a focal region where the incident light beams are reflected by a surface or interface of an object that is proximate to the focal region. The conjugate lens may then receive the reflected light beams. If the object is in-focus, the reflected light beams will project parallel to one another from the conjugate lens. If the object is not in-focus, the reflected light beams will project from the conjugate lens in a non-parallel manner.

Optical systems described herein may determine a focus or profile parameter that is effectively based upon or at least partially determined by the projection relationship of the reflected light beams exiting the conjugate lens. The focus or profile parameter may be a function of one or more geometric characteristics or elements of a reflected light beam, such as an optical path length or projection angle from an optical component. Furthermore, the parameter may be a function of a relation between the reflected light beams (ratio of geometric characteristics, separation distance between beam spots, path spacing between beams). Focus and profile parameters may be indicative of a degree-of-focus of the optical system, a working distance that separates the lens and the object, or a surface profile (e.g., height) of the object at a particular point on the object surface.

By way of example, as the two non-parallel reflected light beams propagate along an optical track, a distance that separates the reflected light beams increases or decreases. Optical systems described herein may determine a relative separation between the reflected light beams. The relative separation is based upon or at least partially determined by the projection relationship of the reflected light beams. For example, the light beams may be propagating parallel to each other thereby maintaining the relative separation, converging toward each other thereby decreasing the relative separation, or diverging away from each other thereby increasing the relative separation. The relative separation may be determined, for example, as a separation distance that extends between beam spots on a detector's surface. The relative separation may also be calculated by individually detecting the beam spots with different detectors. The relative separation can be used to determine a working distance that extends between the conjugate lens and the object that reflected the incident light beams. The relative separation may also be used to determine a degree-of-focus of the optical system. Furthermore, the relative separation may be used to determine a surface profile of the object.

Furthermore, as will be described in greater detail below, embodiments described herein include one or more focus-control systems to determine whether the object, which may include a sample, is sufficiently within a focal plane of the optical system so that the object can be viewed, imaged, and/or inspected. More specifically, embodiments can determine whether the optical system has a sufficient degree-of-focus with respect to the object. The focus determination may be based on reference light beams that are incident upon the object. After determining whether the object is sufficiently in focus with respect to the optical system, embodiments can automatically move the object or the optical system so that the object is within the focal plane of the optical system.

As used herein, the term "object" includes all things that are suitable for imaging, viewing, analyzing, inspecting, or profiling with the optical systems described herein. By way of example only, objects may include semiconductor wafers or chips, recordable media, samples, flow cells, microparticles, slides, or microarrays. Objects generally include one or more surfaces and/or one or more interfaces that a user may desire to image, view, analyze, inspect, and/or determine a profile thereof. The objects may have surfaces or interfaces with relief features such as wells, pits, ridges, bumps, beads or the like.

As used herein, the term "sample" includes various matters of interest. A sample may be imaged or scanned for subsequent analysis. In particular embodiments, a sample may include biological or chemical substances of interests and, optionally, an optical substrate that supports the biological or chemical substances. As such, a sample may or may not include an optical substrate. As used herein, the term "biological or chemical substances" is not intended to be limiting, but may include a variety of biological or chemical substances that are suitable for being imaged or examined with the optical systems described herein. For example, biological or chemical substances include biomolecules, such as nucleosides, nucleic acids, polynucleotides, oligonucleotides, proteins, enzymes, polypeptides, antibodies, antigens, ligands, receptors, polysaccharide, carbohydrate, polyphosphates, nanopores, organelles, lipid layers, cells, tissues, organisms, and biologically active chemical compound(s) such as analogs or mimetics of the aforementioned species.

The biological or chemical substances may be supported by an optical substrate. As used herein, the term "optical substrate" is not intended to be limiting, but may include various materials that support the biological or chemical substances and permit the biological or chemical substances to be at least one of viewed, imaged, and examined. For example, the optical substrate may comprise a transparent material that reflects a portion of incident light and refracts a portion of the incident light. Alternatively, the optical substrate may be, for example, a mirror that reflects the incident light entirely such that no light is transmitted through the optical substrate. Typically, the optical substrate has a flat surface. However, the optical substrate can have a surface with relief features such as wells, pits, ridges, bumps, beads or the like.

In an exemplary embodiment, the optical substrate is a flow cell having flow channels where nucleic acids are sequenced. However, in alternative embodiments, the optical substrate may include one or more slides, planar chips (such as those used in microarrays), or microparticles. In such cases where the optical substrate includes a plurality of microparticles that support the biological or chemical substances, the microparticles may be held by another optical substrate, such as a slide or grooved plate. In particular embodiments, the optical substrate includes diffraction grating based encoded optical identification elements similar to or the same as those described in pending U.S. patent application Ser. No. 10/661,234, entitled Diffraction Grating Based Optical Identification Element, filed Sep. 12, 2003, which is incorporated herein by reference in its entirety, discussed more hereinafter. A bead cell or plate for holding the optical identification elements may be similar to or the same as that described in pending U.S. patent application Ser. No. 10/661,836, entitled "Method and Apparatus for Aligning Microbeads in Order to Interrogate the Same", filed Sep. 12, 2003, and U.S. Pat. No. 7,164,533, entitled "Hybrid Random Bead/Chip Based Microarray", issued Jan. 16, 2007, as well as U.S. patent application Ser. No. 60/609,583, entitled "Improved Method and Apparatus for Aligning Microbeads in Order to Interrogate the Same", filed Sep. 13, 2004, Ser. No. 60/610,910, entitled "Method and Apparatus for Aligning Microbeads in Order to Interrogate the Same", filed Sep. 17, 2004, each of which is incorporated herein by reference in its entirety.

As used herein, the term "optical components" or "focus components" includes various elements that affect the transmission of light. Optical components may be, for example, reflectors, dichroics, beam splitters, collimators, lenses, filters, wedges, prisms, mirrors, and the like.

By way of example, optical systems described herein may be constructed to include various components and assemblies as described in PCT application PCT/US07/07991, entitled "System and Devices for Sequence by Synthesis Analysis", filed Mar. 30, 2007 and/or to include various components and assemblies as described in PCT application PCT/US2008/077850, entitled "Fluorescence Excitation and Detection System and Method", filed Sep. 26, 2008, both of which the complete subject matter are incorporated herein by reference in their entirety. In particular embodiments, optical systems can include various components and assemblies as described in U.S. Pat. No. 7,329,860, of which the complete subject matter is incorporated herein by reference in its entirety. Optical systems can also include various components and assemblies as described in U.S. patent application Ser. No. 12/638,770, filed on Dec. 15, 2009, of which the complete subject matter is incorporated herein by reference in its entirety.

In particular embodiments, methods, and optical systems described herein may be used for sequencing nucleic acids. For example, sequencing-by-synthesis (SBS) protocols are particularly applicable. In SBS, a plurality of fluorescently labeled modified nucleotides are used to sequence dense clusters of amplified DNA (possibly millions of clusters) present on the surface of an optical substrate (e.g., a surface that at least partially defines a channel in a flow cell). The flow cells may contain nucleic acid samples for sequencing where the flow cells are placed within the appropriate flow cell holders. The samples for sequencing can take the form of single nucleic acid molecules that are separated from each other so as to be individually resolvable, amplified populations of a nucleic acid molecules in the form of clusters or other features, or beads that are attached to one or more molecules of nucleic acid. The nucleic acids can be prepared such that they comprise an oligonucleotide primer adjacent to an unknown target sequence. To initiate the first SBS sequencing cycle, one or more differently labeled nucleotides, and DNA polymerase, etc., can be flowed into/through the flow cell by a fluid flow subsystem (not shown). Either a single type of nucleotide can be added at a time, or the nucleotides used in the sequencing procedure can be specially designed to possess a reversible termination property, thus allowing each cycle of the sequencing reaction to occur simultaneously in the presence of several types of labeled nucleotides (e.g. A, C, T, G). The nucleotides can include detectable label moieties such as fluorophores. Where the four nucleotides are mixed together, the polymerase is able to select the correct base to incorporate and each sequence is extended by a single base. One or more lasers may excite the nucleic acids and induce fluorescence. The fluorescence emitted from the nucleic acids is based upon the fluorophores of the incorporated base, and different fluorophores may emit different wavelengths of emission light. Exemplary sequencing methods are described, for example, in Bentley et al., *Nature* 456:53-59 (2008), WO 04/018497; U.S. Pat. No. 7,057,026; WO 91/06678; WO 07/123,744; U.S. Pat. No. 7,329,492; U.S. Pat. No. 7,211,414; U.S. Pat. No. 7,315,019; U.S. Pat. No. 7,405,281, and US 2008/0108082, each of which is incorporated herein by reference.

Other sequencing techniques that are applicable for use of the methods and systems set forth herein are pyrosequencing, nanopore sequencing, and sequencing by ligation. Exemplary pyrosequencing techniques and samples that are particularly useful are described in U.S. Pat. No. 6,210,891; U.S. Pat. No. 6,258,568; U.S. Pat. No. 6,274,320 and Ronaghi, *Genome Research* 11:3-11 (2001), each of which is incorporated herein by reference. Exemplary nanopore techniques and samples that are also useful are described in Deamer et al., *Acc. Chem. Res.* 35:817-825 (2002); Li et al., *Nat. Mater.* 2:611-615 (2003); Soni et al., *Clin Chem.* 53:1996-2001 (2007) Healy et al., *Nanomed.* 2:459-481 (2007) and Cockroft et al., *J. am. Chem. Soc.* 130:818-820; and U.S. Pat. No. 7,001,792, each of which is incorporated herein by reference. Any of a variety of samples can be used in these systems such as substrates having beads generated by emulsion PCR, substrates having zero-mode waveguides, substrates having biological nanopores in lipid bilayers, solid-state substrates having synthetic nanopores, and others known in the art. Such samples are described in the context of various sequencing techniques in the references cited above and further in US 2005/0042648; US 2005/0079510; US 2005/0130173; and WO 05/010145, each of which is incorporated herein by reference.

In other embodiments, optical systems described herein may be utilized for detection of samples that include microarrays. A microarray may include a population of different probe molecules that are attached to one or more substrates such that the different probe molecules can be differentiated from each other according to relative location. An array can include different probe molecules, or populations of the probe molecules, that are each located at a different addressable location on a substrate. Alternatively, a microarray can include separate optical substrates, such as beads, each bearing a different probe molecule, or population of the probe molecules, that can be identified according to the locations of the optical substrates on a surface to which the substrates are attached or according to the locations of the substrates in a liquid. Exemplary arrays in which separate substrates are located on a surface include, without limitation, a Sentrix® Array or Sentrix® BeadChip Array available from Illumina®, Inc. (San Diego, Calif.) or others including beads in wells such as those described in U.S. Pat. Nos. 6,266,459, 6,355,431, 6,770,441, and 6,859,570; and PCT Publication No. WO 00/63437, each of which is hereby incorporated by reference. Other arrays having particles on a surface include those set forth in US 2005/0227252; WO 05/033681; and WO 04/024328, each of which is hereby incorporated by reference.

Any of a variety of microarrays known in the art, including, for example, those set forth herein, can be used in embodiments of the invention. A typical microarray contains sites, sometimes referred to as features, each having a population of probes. The population of probes at each site is typically homogenous having a single species of probe, but in some embodiments the populations can each be heterogeneous. Sites or features of an array are typically discrete, being separated with spaces between each other. The size of the probe sites and/or spacing between the sites can vary such that arrays can be high density, medium density or lower density. High density arrays are characterized as having sites separated by less than about 15 µm. Medium density arrays have sites separated by about 15 to 30 µm, while low density arrays have sites separated by greater than 30 µm. An array useful in the invention can have sites that are separated by less than 100 µm, 50 µm, 10 µm, 5 µm, 1 µm, or 0.5 µm. An apparatus or method of an embodiment of the invention can be used to image an array at a resolution sufficient to distinguish sites at the above densities or density ranges.

Further examples of commercially available microarrays that can be used include, for example, an Affymetrix® GeneChip® microarray or other microarray synthesized in accordance with techniques sometimes referred to as VLSIPS™ (Very Large Scale Immobilized Polymer Synthesis) technologies as described, for example, in U.S. Pat. Nos. 5,324,633; 5,744,305; 5,451,683; 5,482,867; 5,491,074; 5,624,711; 5,795,716; 5,831,070; 5,856,101; 5,858,659; 5,874,219; 5,968,740; 5,974,164; 5,981,185; 5,981,956; 6,025,601; 6,033,860; 6,090,555; 6,136,269; 6,022,963; 6,083,697; 6,291,183; 6,309,831; 6,416,949; 6,428,752 and 6,482,591, each of which is hereby incorporated by reference. A spotted microarray can also be used in a method according to an embodiment of the invention. An exemplary spotted microarray is a CodeLink™ Array available from Amersham Biosciences. Another microarray that is useful is one that is manufactured using inkjet printing methods such as SurePrint™ Technology available from Agilent Technologies.

The systems and methods set forth herein can be used to detect the presence of a particular target molecule in a sample contacted with the microarray. This can be determined, for example, based on binding of a labeled target analyte to a particular probe of the microarray or due to a target-dependent modification of a particular probe to incorporate, remove, or alter a label at the probe location. Any one of several assays can be used to identify or characterize targets using a microarray as described, for example, in U.S. Patent Application Publication Nos. 2003/0108867; 2003/0108900; 2003/0170684; 2003/0207295; or 2005/0181394, each of which is hereby incorporated by reference.

Exemplary labels that can be detected in accordance with embodiments of the invention, for example, when present on a microarray include, but are not limited to, a chromophore; luminophore; fluorophore; optically encoded nanoparticles; particles encoded with a diffraction-grating; electrochemiluminescent label such as $Ru(bpy)^{32+}$; or moiety that can be detected based on an optical characteristic. Fluorophores that may be useful include, for example, fluorescent lanthanide complexes, including those of Europium and Terbium, fluorescein, rhodamine, tetramethylrhodamine, eosin, erythrosin, coumarin, methyl-coumarins, pyrene, Malacite green, Cy3, Cy5, stilbene, Lucifer Yellow, Cascade Blue™, Texas Red, alexa dyes, phycoerythin, bodipy, and others known in the art such as those described in Haugland, *Molecular Probes Handbook*, (Eugene, Oreg.) 6th Edition; The Synthegen catalog (Houston, Tex.), Lakowicz, *Principles of Fluorescence Spectroscopy*, 2nd Ed., Plenum Press New York (1999), or WO 98/59066, each of which is hereby incorporated by reference.

In particular embodiments, the optical system can be configured for Time Delay Integration (TDI) for example in line scanning embodiments as described, for example, in U.S. Pat. No. 7,329,860, of which the complete subject matter is incorporated herein by reference in its entirety. By way of example, the optical assembly may have a 0.75 NA lens and a focus accuracy of +/−125 to 500 nm. The resolution can be 50 to 100 nm. The system may be able to obtain 1,000-10,000 measurements/second unfiltered.

Although embodiments are exemplified with regard to detection of samples that includes biological or chemical substances supported by an optical substrate, it will be understood that other samples can be analyzed, examined, or imaged by the embodiments described herein. Other exemplary samples include, but are not limited to, biological specimens such as cells or tissues, electronic chips such as those used in computer processors, or the like. Examples of some of the applications include microscopy, satellite scanners, high-resolution reprographics, fluorescent image acquisition, analyzing and sequencing of nucleic acids, DNA sequencing, sequencing-by-synthesis, imaging of microarrays, imaging of holographically encoded microparticles and the like.

In other embodiments, the optical systems may be configured to inspect an object to determine certain features or structures of the object. For example, the optical systems may be used to inspect a surface of the object, (e.g., semiconductor chip, silicon wafer) to determine whether there are any deviations or defects on the surface.

FIG. 1 illustrates a block diagram of an optical system 100 formed in accordance with one embodiment. By way of example only, the optical system 100 may be a sampler imager that images a sample of interest for analysis. In other embodiments, the optical system 100 may be a profilometer that determines a surface profile (e.g., topography) of an object. Furthermore, various other types of optical systems may use the mechanisms and systems described herein. In the illustrated embodiment, the optical system 100 includes an optical assembly 106, an object holder 102 for supporting an object 110 near a focal plane FP of the optical assembly 106, and a stage controller 115 that is configured to move the object holder 102 in a lateral direction (along an X-axis and/or a Y-axis that extend into the page) or in a vertical/elevational direction along a Z-axis. The optical system 100 may also include a system controller or computing system 120 that is operatively coupled to the optical assembly 106, the stage controller 115, and/or the object holder 102.

In particular embodiments, the optical system 100 is a sample imager configured to image samples. Although not shown, a sample imager may include other sub-systems or devices for performing various assay protocols. By way of example only, the sample may include a flow cell having flow channels. The sample imager may include a fluid control system that includes liquid reservoirs that are fluidicly coupled to the flow channels through a fluidic network. The sample imager may also include a temperature control system that may have a heater/cooler configured to regulate a temperature of the sample and/or the fluid that flows through the sample. The temperature control system may include sensors that detect a temperature of the fluids.

As shown, the optical assembly 106 is configured to direct input light to an object 110 and receive and direct output light to one or more detectors. The output light may be input light that was at least one of reflected and refracted by the object 110 and/or the output light may be light emitted from the object 110. To direct the input light, the optical assembly 106 may include at least one reference light source 112 and at least one excitation light source 114 that direct light, such as light beams having predetermined wavelengths, through one or more optical components of the optical assembly 106. The optical assembly 106 may include various optical components, including a conjugate lens 118, for directing the input light toward the object 110 and directing the output light toward the detector(s).

In the exemplary embodiment, the reference light source 112 may be used by a distance measuring system or a focus-control system (or focusing mechanism) of the optical system 100 and the excitation light source 114 may be used to excite the biological or chemical substances of the object 110 when the object 110 includes a biological or chemical sample. The excitation light source 114 may be arranged to illuminate a bottom surface of the object 110, such as in TIRF imaging, or may be arranged to illuminate a top surface of the object 110, such as in epi-fluorescent imaging. As shown in FIG. 1, the conjugate lens 118 directs the input light to a focal region 122 lying within the focal plane FP. The lens 118 has an optical axis 124 and is positioned a working distance $WD_1$ away from the object 110 measured along the optical axis 124. The stage controller 115 may move the object 110 in the Z-direction to adjust the working distance $WD_1$ so that, for example, a portion of the object 110 is within the focal region 122.

To determine whether the object 110 is in focus (i.e., sufficiently within the focal region 122 or the focal plane FP), the optical assembly 106 is configured to direct at least one pair of light beams to the focal region 122 where the object 110 is approximately located. The object 110 reflects the light beams. More specifically, an exterior surface of the object 110 or an interface within the object 110 reflects the light beams. The reflected light beams then return to and propagate through the lens 118. As shown, each light beam has an optical path that includes a portion that has not yet been reflected by the object 110 and a portion that has been reflected by the object 110. The portions of the optical paths prior to reflection are designated as incident light beams 130A and 132A and are indicated with arrows pointing toward the object 110. The portions of the optical paths that have been reflected by the object 110 are designated as reflected light beams 130B and 132B and are indicated with arrows pointing away from the object 110. For illustrative purposes, the light beams 130A, 130B, 132A, and 132B are shown as having different optical paths within the lens 118 and near the object 110. However, in the exemplary embodiment, the light beams 130A and 132B propagate in opposite directions and are configured to have the same or substantially overlapping optical paths within the lens 118 and near the object 110, and the light beams 130B and 132A propagate in opposite directions and are configured to have the same or substantially overlapping optical paths within the lens 118 and near the object 110.

In the embodiment shown in FIG. 1, light beams 130A, 130B, 132A, and 132B pass through the same lens that is used for imaging. In an alternative embodiment, the light beams used for distance measurement or focus determination can pass through a different lens that is not used for imaging. In this alternative embodiment, the lens 118 is dedicated to passing beams 130A, 130B, 132A, and 132B for distance measurement or focus determination, and a separate lens (not shown) is used for imaging the object 110. Similarly, it will be understood that the systems and methods set forth herein for focus determination and distance measurement can occur using a common objective lens that is shared with the imaging optics or, alternatively, the objective lenses exemplified herein can be dedicated to focus determination or distance measurement.

The reflected light beams 130B and 132B propagate through the lens 118 and may, optionally, be further directed by other optical components of the optical assembly 106. As shown, the reflected light beams 130B and 132B are detected by at least one focus detector 144. In the illustrated embodiment, both reflected light beams 130B and 132B are detected by a single focus detector 144. The reflected light beams may be used to determine relative separation $RS_1$. For example, the relative separation $RS_1$ may be determined by the distance separating the beam spots from the impinging reflected light beams 130B and 132B on the focus detector 144 (i.e., a separation distance). The relative separation $RS_1$ may be used to determine a degree-of-focus of the optical system 100 with respect to the object 110. However, in alternative embodiments, each reflected light beam 130B and 132B may be detected by a separate corresponding focus detector 144 and the relative separation $RS_1$ may be determined based upon a location of the beam spots on the corresponding focus detectors 144.

If the object 110 is not within a sufficient degree-of-focus, the computing system 120 may operate the stage controller 115 to move the object holder 102 to a desired position. Alternatively or in addition to moving the object holder 102, the optical assembly 106 may be moved in the Z-direction and/or along the XY plane.

For example, the object 110 may be relatively moved a distance $\Delta Z_1$ toward the focal plane FP if the object 110 is located above the focal plane FP (or focal region 122), or the object 110 may be relatively moved a distance $\Delta Z_2$ toward the focal plane FP if the object 110 is located below the focal plane FP (or focal region 122). In some embodiments, the optical system 100 may substitute the lens 118 with another lens 118 or other optical components to move the focal region 122 of the optical assembly 106.

The example set forth above and in FIG. 1 has been presented with respect to a system for controlling focus or for determining degree-of-focus. The system is also useful for determining the working distance $WD_1$ between the object 110 and the lens 118. In such embodiments, the focus detector 144 can function as a working distance detector and the distance separating the beam spots on the working distance detector can be used to determine the working distance between the object 110 and the lens 118. For ease of description, various embodiments of the systems and methods are exemplified herein with regard to controlling focus or determining degree-of-focus. It will be understood that the systems and methods can also be used to determine the working distance between an object and a lens. Likewise, the systems and methods may also be used to determine a surface profile of an object.

In the exemplary embodiment, during operation, the excitation light source 114 directs input light (not shown) onto the object 110 to excite fluorescently-labeled biological or chemical substances. The labels of the biological or chemical substances provide light signals 140 (also called light emissions) having predetermined wavelength(s). The light signals 140 are received by the lens 118 and then directed by other optical components of the optical assembly 106 to at least one object detector 142. Although the illustrated embodiment only shows one object detector 142, the object detector 142 may comprise multiple detectors. For example, the object detector 142 may include a first detector configured to detect one or more wavelengths of light and a second detector configured to detect one or more different wavelengths of light. The optical assembly 106 may include a lens/filter assembly that directs different light signals along different optical paths toward the corresponding object detectors. Such optical systems are described in further detail by PCT Application No. PCT/US07/07991, entitled "System and Devices for Sequence by Synthesis Analysis", filed Mar. 30, 2007 and PCT Application No. PCT/US2008/077850, entitled "Fluorescence Excitation and Detection System and Method", filed Sep. 26, 2008, both of which the complete subject matter are incorporated herein by reference in their entirety.

The object detector 142 communicates object data relating to the detected light signals 140 to the computing system 120. The computing system 120 may then record, process, analyze, and/or communicate the data to other users or computing systems, including remote computing systems through a communication line (e.g., Internet). By way of example, the object data may include imaging data that is processed to generate an image(s) of the object 110. The images may then be analyzed by the computing system and/or a user of the optical system 100. In other embodiments, the object data may not only include light emissions from the biological or chemical substances, but may also include light that is at least one of reflected and refracted by the optical substrate or other components. For example, the light signals 140 may include light that has been reflected by encoded microparticles, such as the holographically encoded optical identification elements described above.

In some embodiments, a single detector may provide both functions as described above with respect to the object and focus detectors 142 and 144. For example, a single detector may detect the reflected light beams 130B and 132B and also the light signals 140.

The optical system 100 may include a user interface 125 that interacts with the user through the computing system 120. For example, the user interface 125 may include a display (not shown) that shows and requests information from a user and a user input device (not shown) to receive user inputs.

The computing system 120 may include, among other things, an object analysis module 150 and a focus-control module 152. The focus-control module 152 is configured to receive focus data obtained by the focus detector 144. The focus data may include signals representative of the beam spots incident upon the focus detector 144. The data may be processed to determine relative separation (e.g., separation distance between the beam spots). A degree-of-focus of the optical system 100 with respect to the object 110 may then be determined based upon the relative separation. In particular embodiments, the working distance $WD_1$ between the object 110 and lens 118 can be determined. Likewise, the object analysis module 150 may receive object data obtained by the object detectors 142. The object analysis module may process or analyze the object data to generate images of the object.

Furthermore, the computing system 120 may include any processor-based or microprocessor-based system, including systems using microcontrollers, reduced instruction set computers (RISC), application specific integrated circuits (ASICs), field programmable gate array (FPGAs), logic circuits, and any other circuit or processor capable of executing functions described herein. The above examples are exemplary only, and are thus not intended to limit in any way the definition and/or meaning of the term system controller. In the exemplary embodiment, the computing system 120 executes a set of instructions that are stored in one or more storage elements, memories, or modules in order to at least one of obtain and analyze object data. Storage elements may be in the form of information sources or physical memory elements within the optical system 100.

The set of instructions may include various commands that instruct the optical system 100 to perform specific protocols. For example, the set of instructions may include various commands for performing assays and imaging the object 110 or for determining a surface profile of the object 110. The set of instructions may be in the form of a software program. As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

As described above, the excitation light source 114 generates an excitation light that is directed onto the object 110. The excitation light source 114 may generate one or more laser beams at one or more predetermined excitation wavelengths. The light may be moved in a raster pattern across portions of the object 110, such as groups in columns and rows of the object 110. Alternatively, the excitation light may illuminate one or more entire regions of the object 110 at one time and serially stop through the regions in a "step and shoot" scanning pattern. Line scanning can also be used as described, for example, in U.S. Pat. No. 7,329,860, of which the complete subject matter is incorporated herein by reference in its entirety. The object 110 produces the light signals 140, which may include light emissions generated in response to illumination of a label in the object 110 and/or light that has been reflected or refracted by an optical substrate of the object 110. Alternatively, the light signals 140 may be generated, without illumination, based entirely on emission properties of a material within the object 110 (e.g., a radioactive or chemiluminescent component in the object).

The object and focus detectors 142 and 144 may be, for example photodiodes or cameras. In some embodiments herein, the detectors 142 and 144 may comprise a camera that has a 1 mega pixel CCD-based optical imaging system such as a 1002×1004 CCD camera with 8 gm pixels, which at 20× magnification can optionally image an area of 0.4×0.4 mm per tile using an excitation light that has a laser spot size of 0.5×0.5 mm (e.g., a square spot, or a circle of 0.5 mm diameter, or an elliptical spot, etc.). Cameras can optionally have more or less than 1 million pixels, for example a 4 mega pixel camera can be used. In many embodiments, it is desired that the readout rate of the camera should be as fast as possible, for example the transfer rate can be 10 MHz or higher, for example 20 or 30 MHz. More pixels generally mean that a larger area of surface, and therefore more sequencing reactions or other optically detectable events, can be imaged simultaneously for a single exposure. In particular embodiments, the CCD camera/TIRF lasers may collect about 6400 images to interrogate 1600 tiles (since images are optionally done in 4 different colors per cycle using combinations of filters, dichroics and detectors as described herein). For a 1 Mega pixel CCD, certain images optionally can contain between about 5,000 to 50,000 randomly spaced unique nucleic acid clusters (i.e., images upon the flow cell surface). At an imaging rate of 2 seconds per tile for the four colors, and a density of 25000 clusters per tile, the systems herein can optionally quantify about 45 million features per hour. At a faster imaging rate, and higher cluster density, the imaging rate can be improved. For example, a readout rate of a 20 MHz camera, and a resolved cluster every 20 pixels, the readout can be 1 million clusters per second. A detector can be configured for Time Delay Integration (TDI) for example in line scanning embodiments as described, for example, in U.S. Pat. No. 7,329,860, of which the complete subject matter is incorporated herein by reference in its entirety. Other useful detectors include, but are not limited, to an optical quadrant photodiode detector, such as those having a 2×2 array of individual photodiode active areas fabricated on a single chip, examples of which are available from Pacific Silicon Sensor (Westlake Village, Calif.), or a position sensitive detector such as those having a monolithic PIN photodiode with a uniform resistance in one or two dimensions, examples of which are available from Hamamatsu Photonics, K.K., (Hamamatsu City, Japan).

Figure 2:
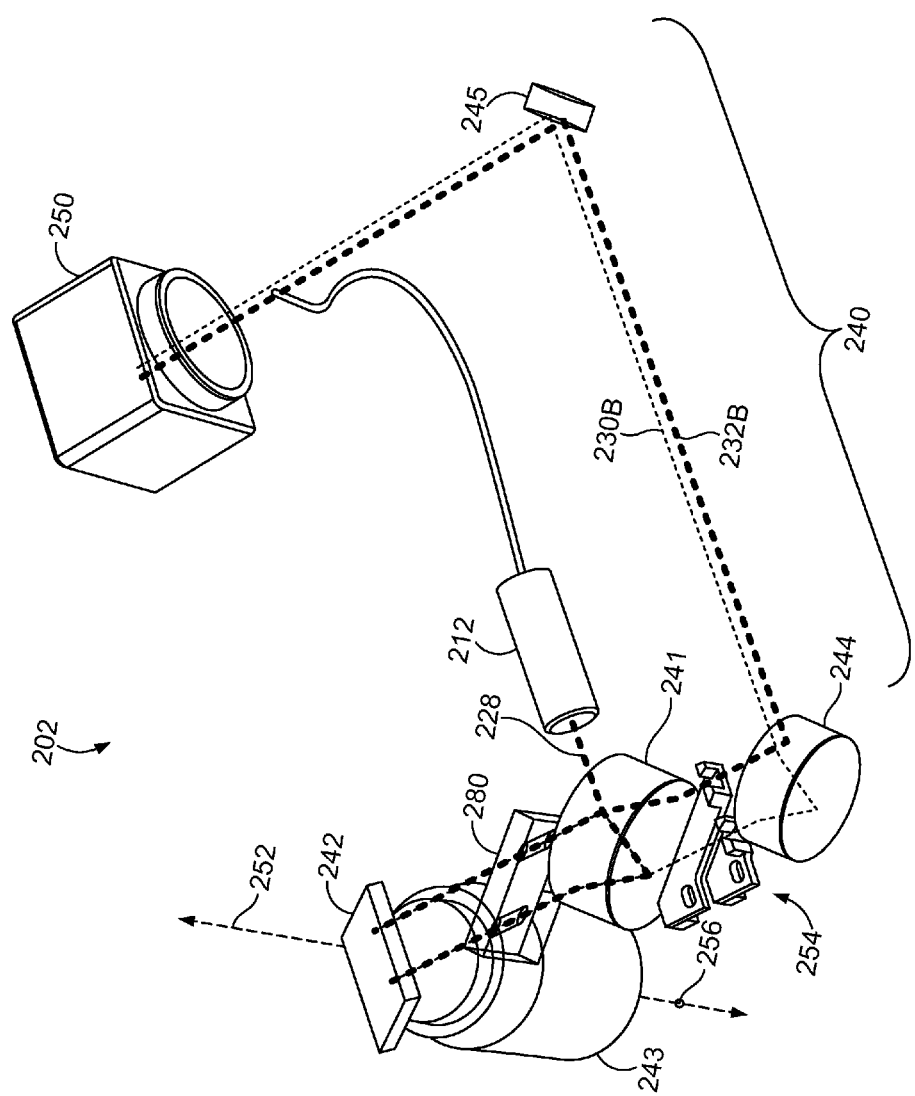
FIG. 2 is a perspective view of an optical assembly formed in accordance with one embodiment that may be used with the optical system shown in FIG. 1.
Figure 3:
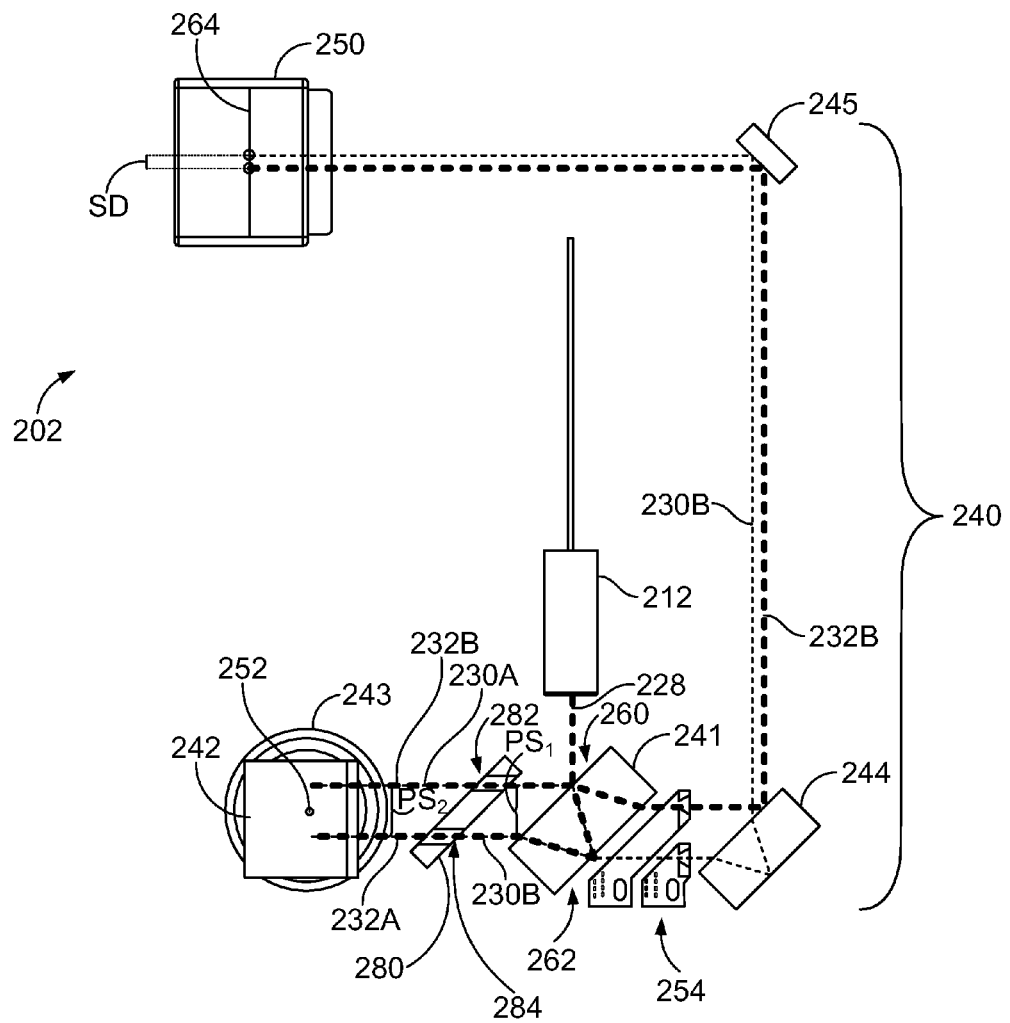
FIG. 3 is a plan view of the optical assembly shown in FIG. 2.

FIGS. 2 and 3 illustrate perspective and plan views of an optical assembly 202 formed in accordance with one embodiment. The optical assembly 202 may be used with the optical system 100 (FIG. 1) or other optical systems. As shown, the optical assembly 202 includes an optical train 240 of optical components 241-245 that direct light beams 230 and 232 along an optical track or course between an object of interest (not shown) and a focus detector 250. In particular embodiments, the focus detector can also be referred to as a distance detector. The series of optical components 241-245 of the optical train 240 include a dual-beam generator 241, a beam splitter 242, a conjugate lens 243, a beam combiner 244, and a fold mirror 245.

The optical assembly 202 includes a reference light source 212 that provides a light beam 228 to the dual-beam generator 241. The reference light source 212 may be, for example, a 660 nm laser. The dual-beam generator 241 provides a pair of parallel incident light beams 230A and 232A and directs the incident light beams 230A and 232A toward the beam splitter 242. In the illustrated embodiment, the dual-beam generator 241 comprises a single body having opposite parallel surfaces 260 and 262 (FIG. 3). The first surface 260 reflects a portion of the light beam 228 that forms the incident light beam 230A and refracts a portion of the light beam 228. The refracted portion of the light beam 228 is reflected by the opposite second surface 262 toward the first surface 260, which forms the incident light beam 232A.

The dual-beam generator 241 directs the parallel incident light beams 230A and 232A toward the beam splitter 242. The beam splitter 242 reflects the incident light beams 230A and 232A toward the conjugate lens 243. In the exemplary embodiment, the beam splitter 242 includes a pair of reflectors (e.g., aluminized tabs) that are positioned to reflect the incident light beams 230A and 232A and the reflected light beams 230B and 232B. The beam splitter 242 is positioned to reflect the incident light beams 230A and 232A so that the incident light beams 230A and 232A propagate parallel to an optical axis 252 of the lens 243. The optical axis 252 extends through a center of the lens 243 and intersects a focal region 256 (FIG. 2). The lens 243 may be a near-infinity conjugated objective lens. In alternative embodiments, the incident light beams 230A and 232A propagate in a non-parallel manner with respect to the optical axis 252. Also shown in FIG. 3, the incident light beams 230A and 232A may be equally spaced apart from the optical axis 252 as the incident light beams 230A and 232A propagate through the lens 243.

As described above with respect to the optical system 100, the incident light beams 230A and 232A converge toward the focal region 256 (FIG. 2) and are reflected by an object 268 (shown in FIG. 4) located proximate to the focal region 256 and return to and propagate through the lens 243 as reflected light beams 230B and 232B. The reflected light beams 230B and 232B may propagate along a substantially equal or overlapping optical path with respect to the incident light beams 232A and 230A, respectively, through the lens 243 and toward the dual-beam generator 241. More specifically, the reflected light beam 230B propagates in an opposite direction along substantially the same optical path of the incident light beam 232A, and the reflected light beam 232B propagates in an opposite direction along substantially the same optical path of the incident light beam 230A. The reflected light beams 230B and 232B exit the lens 243 separated by a path spacing $PS_2$ that is substantially equal to a path spacing $PS_1$ that separates the incident light beams 230A and 232A (shown in FIG. 3).

As shown in FIGS. 2 and 3, the reflected light beams 230B and 232B are incident upon and directed by the dual-beam generator 241 through a range limiter 254 toward the beam combiner 244. In the illustrated embodiment, the beam combiner 244 is configured to modify the path spacing PS that separates the reflected light beams 230B and 232B. The path spacing PS at the beam combiner 244 may be re-scaled to be substantially equal to a separation distance $SD_1$ of the reflected light beams 230B and 232B detected by the focus detector 250. The separation distance $SD_1$ is a distance measured between the reflected light beams at a predetermined portion of the optical track, such as at the focus detector 250. In particular embodiments, the separation distance $SD_1$ at the focus detector 250 is less than the path spacing PS at the beam combiner 244 so that only a single focus detector 250 may detect both reflected light beams 230B and 232B. Furthermore, the beam combiner 244 may substantially equalize the optical path lengths of the reflected light beams 230B and 232B.

The reflected light beams 230B and 232B propagate substantially parallel to each other between optical components after exiting the lens 243. In the illustrated embodiment, the reflected light beams 230B and 232B propagate substantially parallel to each other along the optical track between the lens 243 and the focus detector 250. As used herein, two light beams propagate "substantially parallel" to one another if the two light beams are essentially co-planar and, if allowed to propagate infinitely, would not intersect each other or converge/diverge with respect to each other at a slow rate. For instance, two light beams are substantially parallel if an angle of intersection is less than 20° or, more particularly, less than 10° or even more particularly less than 1°. For instance, the reflected light beams 230B and 232B may propagate substantially parallel to each other between the beam splitter 242 and the dual-beam generator 241; between the dual-beam generator 241 and the beam combiner 244; between the beam combiner 244 and the fold mirror 245; and between the fold mirror 245 and the focus detector 250.

The optical train 240 is configured to maintain a projection relationship (described further below) between the reflected light beams 230B and 232B throughout the optical track so that a degree-of-focus may be determined. By way of example, if the optical assembly 202 is in focus with the object, the reflected light beams 230B and 232B will propagate parallel to each other between each optical component in the optical train 240. If the optical assembly 202 is not in focus with the object, the reflected light beams 230B and 232B are co-planar, but propagate at slight angles with respect to each other. For example, the reflected light beams 230B and 232B may diverge from each other or converge toward each other as the reflected light beams 230B and 232B travel along the optical track to the focus detector 250.

To this end, each optical component 241-245 may have one or more surfaces that are shaped and oriented to at least one of reflect and refract the reflected light beams 230B and 232B so that the reflected light beams 230B and 232B maintain the projection relationship between the reflected light beams 230B and 232B. For example, the optical components 242 and 245 have a planar surface that reflects both of the incident light beams 230B and 232B. The optical components 241 and 244 may also have parallel surfaces that each reflects one of the incident light beams 230B and 232B. Accordingly, if the reflected light beams 230B and 232B are parallel, the reflected light beams 230B and 232B will remain parallel to each other after exiting each optical component. If the reflected light beams 230B and 232B are converging or diverging toward each other at certain rate, the reflected light beams 230B and 232B will be converging or diverging toward each other at the same rate after exiting each optical component. Accordingly, the optical components along the optical track may include a planar surface that reflects at least one of the reflected light beams or a pair of parallel surfaces where each surface reflects a corresponding one of the reflected light beams.

An optical system can include one or more optical assemblies for determination of a working distance or focus. For example, an optical system can include two optical assemblies of the type shown in FIGS. 2 and 3 to allow focus to be determined at two different positions on an object or to provide for determination of the working distance between the optical system and the object at two different positions. For embodiments, in which more than one optical assembly is present, the optical assemblies can be discrete and separate or the optical assemblies can share optical components. The optical assemblies can share optical components such as reference light source 212, focus detector 250, fold mirror 245, beam combiner 244, dual-beam generator 241, beam splitter 242, epi-fluorescent (EPI) input reflector 280 and range limiter 254. Optical components can be shared by placing a beam splitter upstream of the shared components in the optical train. Although exemplified for the optical assembly shown in FIGS. 2 and 3, one or more versions of other optical assemblies that are exemplified herein can be present in a particular optical system. Furthermore, a particular optical system can include various combinations of the optical assemblies set forth herein.

As shown in FIG. 3, the reflected light beams 230B and 232B are ultimately incident upon a detector surface 264 of the focus detector 250 at corresponding beam spots. The beam spots are spaced apart by a separation distance $SD_1$. The separation distance $SD_1$ indicates whether the optical assembly 202 has a sufficient degree-of-focus with respect to the object. The separation distance $SD_1$ on the detector surface 264 also indicates a working distance between lens 243 and the object being imaged.

In other embodiments, the optical components 241-245 may be substituted with alternative optical components that perform substantially the same function as described above. For example, the beam splitter 242 may be replaced with a prism that directs the incident light beams 230A and 232A through the lens 243 parallel to the optical axis 252. The beam combiner 244 may not be used or may be replaced with an optical flat that does not affect the path spacing of the reflected light beams. Furthermore, the optical components 241-245 may have different sizes and shapes and be arranged in different configurations or orientations as desired. For example, the optical train 240 of the optical assembly 202 may be configured for a compact design.

Furthermore, in alternative embodiments, the parallel light beams may be provided without the dual-beam generator 241. For example, a reference light source 212 may include a pair of light sources that are configured to provide parallel incident light beams. In alternative embodiments, the focus detector 250 may include two focus detectors arranged side-by-side in fixed, known positions with respect to each other. Each focus detector may detect a separate reflected light beam. Relative separation between the reflected light beams may be determined based on the positions of the beam spots with the respective focus detectors and the relative position of the focus detectors with respect to each other.

Although not illustrated in FIGS. 2 and 3, the optical assembly 202 may also be configured to facilitate collecting output light that is projected from the object 268. For example, the optical assembly 202 may include an epi-fluorescent (EPI) input reflector 280 that is positioned to reflect incident light that is provided by an excitation light source (not shown). The light may be directed toward the beam splitter 242 that reflects at least a portion of the excitation light and directs the light along the optical axis 252 through the lens 243. The lens 243 directs the light onto the object 268, which may provide the output light. The lens 243 then receives the output light (e.g., light emissions) from the object 268 and direct the output light back toward the beam splitter 242. The beam splitter 242 may permit a portion of the output light to propagate therethrough along the optical axis. The output light may then be detected by an object detector (not show).

As shown in FIG. 3, the EPI input reflector 280 includes two passages 282 and 284 that allow the light beams 230 and 232 to propagate therethrough without being affected by the input reflector 280. Accordingly, the beam splitter 242 may reflect the incident and reflected light beams 230A, 230B, 232A, and 232B and may also reflect the excitation light.

FIGS. 4-9 show different projection relationships between reflected light beams 230B and 232B and corresponding beam spots 270 and 272 on the detector surface 264. As discussed above, the projection relationship between the reflected light beams is based upon where the object is located in relation to the focal region. When the object is moved with respect to the focal region, the projection relationship between the reflected light beams changes and, consequently, the relative separation between the reflected light beams also changes. FIGS. 4-9 illustrate how a separation distance SD measured between beam spots may change as the projection relationship between the reflected light beams change. However, the separation distance SD is just one manner of determining relative separation between the reflected light beams. Accordingly, those skilled in the art understand that FIGS. 4-9 illustrate only one manner of determining the relative separation and that other manners for determining relative separation or the projection relationship are possible.

Figure 4:
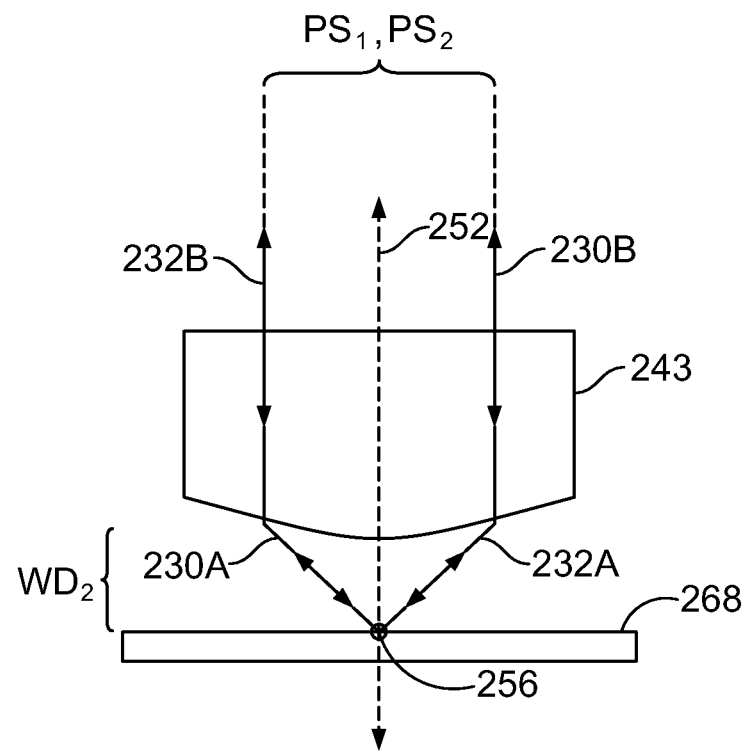
FIG. 4 illustrates incident and reflected light beams when the optical assembly shown in FIG. 2 is in focus with respect to an object.
Figure 5:
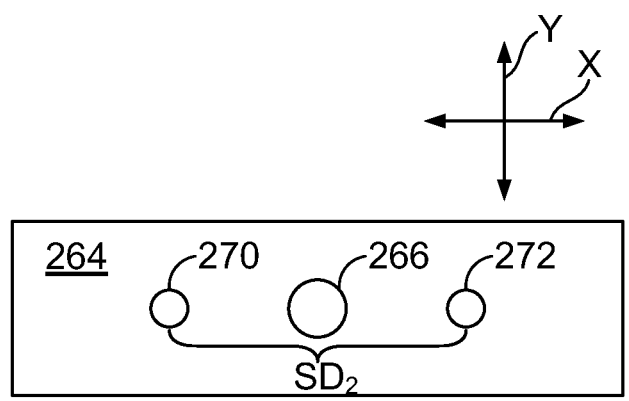
FIG. 5 illustrates beam spots on a detector surface that are provided by the reflected light beams shown in FIG. 4.

FIGS. 4 and 5 show a projection relationship between reflected light beams 230B and 232B when the optical assembly 202 (FIG. 2) is in focus with respect to an object 268. As shown, the incident light beams 230A and 232A propagate through the lens 243 parallel to each other and spaced apart by a path spacing $PS_1$. In the illustrated embodiment, the incident light beams 230A and 232A propagate parallel to the optical axis 252 of the lens 243 and are equidistant from the optical axis 252. In alternative embodiments, the incident light beams 230A and 232A may propagate in a non-parallel manner with respect to the optical axis 252 and have different spacings therefrom. In a particular alternative embodiment, one of the incident light beams 230A or 232A coincides with the optical axis 252 of the lens 243 and the other is spaced apart from the optical axis 252.

The incident light beams 230A and 232A are directed by the lens 243 to converge toward the focal region 256. In such embodiments where the incident light beams are non-parallel to the optical axis, the focal region may have a different location than the location shown in FIG. 4. The incident light beams 230A and 232A are reflected by the object 268 and form the reflected light beams 230B and 232B. The reflected light beams 230B and 232B return to and propagate through the lens 243 and parallel to the optical axis 252. The reflected light beams 230B and 232B exit the lens 243 parallel to each other and spaced apart by a path spacing $PS_2$. When the optical assembly 202 is in focus, the path spacings $PS_1$ and $PS_2$ are equal.

Accordingly, when the optical assembly 202 is in focus, the projection relationship of the reflected light beams 230B and 232B exiting the lens 243 includes two parallel light beams. The optical train 240 is configured to maintain the parallel projection relationship. For example, when the optical assembly 202 is in focus, the reflected light beams 230B and 232B are parallel to each other when exiting the dual-beam generator 241, when exiting the beam combiner 244, and when reflected by the fold mirror 245. Although the projection relationship is maintained, the path spacing $PS_2$ may be re-scaled by a beam combiner.

As shown in FIG. 5, the reflected light beams 230B and 232B of FIG. 4 are incident upon the detector surface 264 and form the beam spots 270 and 272. When the optical assembly 202 is in focus, the beam spots 270 and 272 have a separation distance $SD_2$. The separation distance $SD_2$ can be based upon (or a function of) dimensions of the beam combiner 244 and an angle of incidence with respect to the parallel surfaces of the beam combiner 244 and the impinging reflected light beams 230B and 232B. The separation distance $SD_2$ is also based upon the projection relationship of the reflected light beams 230B and 232B exiting the lens 243. As shown in FIG. 5, the detector surface 264 has a center point or region 266. If all of the optical components 241-245 (FIG. 2) of the optical train 240 are in respective desired positions, the beam spots 270 and 272 may be equally spaced apart from the center region 266 along an X-axis and vertically centered within the detector surface 264. Also shown, the beam spots 270 and 272 may have a select morphology that is correlated with the optical assembly 202 being in focus. For example, the beam spots 270 and 272 may have an airy radius that correlates to the optical assembly 202 being in focus.

FIGS. 6 and 7 show a projection relationship between the reflected light beams 230B and 232B when the optical assembly 202 (FIG. 2) is below focus. As described above, the incident light beams 230A and 232A propagate through the lens 243 parallel to each other and spaced apart by the path spacing $PS_1$. The incident light beams 230A and 232A intersect each other at the focal region 256 and are then reflected by the object 268 to form the reflected light beams 230B and 232B. However, as shown in FIG. 6, when the reflected light beams 230B and 232B exit the lens 243, the reflected light beams 230B and 232B are slightly converging toward the optical axis 252 and each other. Also shown, the path spacing $PS_2$ is greater than the path spacing $PS_1$.

Accordingly, when the object 268 is located below the focal region 256, the projection relationship of the reflected light beams 230B and 232B includes two light beams that converge toward each other. Similar to above, the optical train 240 is configured to maintain the converging projection relationship. For example, the reflected light beams 230B and 232B are converging toward each other when exiting the dual-beam generator 241, when exiting the beam combiner 244, and when reflected by the fold mirror 245.

As shown in FIG. 7, when the object 268 is located below the focal region 256, the beam spots 270 and 272 have a separation distance $SD_3$ that is less than the separation distance $SD_2$ (FIG. 5). The separation distance $SD_3$ is less because the reflected light beams 130B and 132B converge toward each other throughout the optical track between the lens 243 and the focus detector 250. Also shown in FIG. 7, the beam spots 270 and 272 may have a select morphology that is correlated with the beam spots 270 and 272. The morphology of the beam spots 270 and 272 when the object 268 is located below the focal region 256 is different than the morphology of the beam spots 270 and 272 when the object 268 is in focus. The beam spots 270 and 272 may have a different airy radius that correlates to the object being below the focal region 256.

FIGS. 8 and 9 show a projection relationship between the reflected light beams 230B and 232B when the optical assembly 202 (FIG. 2) is above focus. As described above, the incident light beams 230A and 232A propagate through the lens 243 parallel to each other and spaced apart by the path spacing PS$_1$. Before the incident light beams 230A and 232A reach the focal region 256, the incident light beams 230A and 232A are reflected by the object 268 to form the reflected light beams 230B and 232B. However, as shown in FIG. 8, when the reflected light beams 230B and 232B exit the lens 243, the reflected light beams 230B and 232B diverge away from the optical axis 252 and away from each other. Also shown, the path spacing PS$_2$ is less than the path spacing PS$_1$.

Accordingly, when the object 268 is located above the focal region 256, the projection relationship of the reflected light beams 230B and 232B includes two light beams that diverge away from each other. The optical train 240 is configured to maintain the diverging projection relationship. For example, the reflected light beams 230B and 232B are diverging away from each other when exiting the dual-beam generator 241, when exiting the beam combiner 244, and when reflected by the fold mirror 245.

As shown in FIG. 9, when the object 268 is located above the focal region 256, the beam spots 270 and 272 have a separation distance SD$_4$ that is greater than the separation distance SD$_2$. The separation distance SD$_4$ is greater because the reflected light beams 130B and 132B diverge from each other throughout the optical track between the lens 243 and the focus detector 250. Also shown in FIG. 9, the beam spots 270 and 272 may have a select morphology that is correlated with the beam spots 270 and 272. The morphology of the beam spots 270 and 272 when the object 268 is located above the focal region 256 is different than the morphology of the beam spots 270 and 272 when the object 268 is in focus or below the focal region 256. Likewise, the beam spots 270 and 272 may have a different airy radius that correlates to the object being below the focal region 256.

As described above, if the object 268 is below the focal region 256, the separation distance SD$_3$ is less than the separation distance SD$_2$ in which the object 268 is within the focal region 256. If the object 268 is above the focal region 256, the separation distance SD$_4$ is greater than the separation distance SD$_2$. As such, the optical assembly 202 not only determines that the object 268 is not located within the focal region 256, but may also determine a direction to move the object 268 with respect to the lens 243. Furthermore, a value of the separation distance SD$_3$ may be used to determine how far to move the object 268 with respect to the lens 243. As set forth elsewhere herein, a measurement of separation distance on a detector can be used to determine the working distance between the lens and an object that is being detected through the lens. Furthermore, the separation distance on the detector may be used to determine a profile of an object surface.

Accordingly, relative separation (e.g., a separation distance) is a function of the projection relationship (i.e., what rate the reflected light beams 230B and 232B are diverging or converging) and a length of the optical track measured from the lens 243 to the focus detector 250. As the optical track between the lens 243 and the focus detector 250 increases in length, the separation distance decreases or increases if the object is not in focus. As such, the length of the optical track may be configured to facilitate distinguishing the separation distances SD$_3$ and SD$_4$. For example, the optical track may be configured so that converging reflected light beams do not cross each other and/or configured so that diverging light beams do not exceed a predetermined relative separation between each other. To this end, the optical track between optical components of the optical train 240 may be lengthened or shortened as desired.

Furthermore, additional optical components, such as a beam folding device, may be added to increase the length of the optical path. A beam folding device or other device for increasing the optical path length can act as an amplifier since the increase in path length for two beams that deviate from parallel will increase the magnitude of the deviation as perceived on the surface of a detector that intersects the two beams (i.e. increased path length will increase the separation distance for spots generated from diverging beams and will decrease the separation distance for spots generated from converging beams).

In particular embodiments, the computing system that receives the focus data from the focus detector 250 only identifies a centroid of each beam spot to determine the separation distance SD. However, the computing system may also analyze a morphology of each beam spot. As shown above, the beam spots 270 and 272 may have different airy radiuses (or disks) based upon the degree-of-focus of the optical assembly 202. The airy radiuses may be analyzed in addition to the separation distance SD to determine a degree-of-focus of the optical assembly 202.

Figure 10:
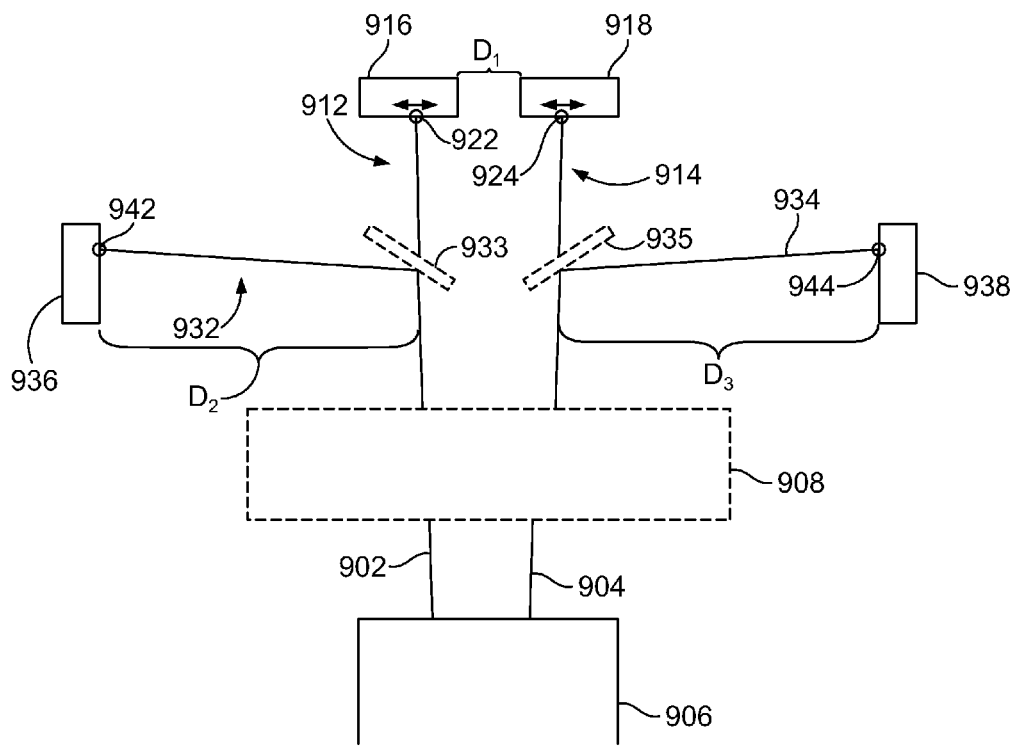
FIG. 10 illustrates alternative embodiments for determining relative separation between reflected light beams.

FIG. 10 illustrates alternative embodiments for determining relative separation between reflected light beams 902 and 904. As shown in FIG. 10, the reflected light beams 902 and 904 exit the lens 906 having a diverging projection relationship. However, the projection relationship may also be parallel or converging. The reflected light beams 902 and 904 may be redirected along an optical track by an optical train 908 (generally indicated by a dashed box).

FIG. 10 illustrates various embodiments in which spot detectors have known spatial relationships with respect to each other and detect corresponding beam spots. The spot detectors may be, for example, focus detectors or working distance detectors as discussed above. In a first embodiment, the reflected light beam 902 may have an optical path 912 and is incident upon a spot detector 916. The reflected light beam 904 may have an optical path 914 and is incident upon a spot detector 918. (Optical components 933 and 935 are provided as dashed boxes to indicate that the optical components are optionally present, for example, being not present in a first embodiment of FIG. 10.) The spot detectors 916 and 918 have a known spatial relationship with respect to each other. For example, the spot detectors 916 and 918 may be oriented to face a common direction and be spaced apart a distance D$_1$. Each of the spot detectors 916 and 918 may detect a corresponding beam spot 922 and 924 from the reflected light beams 902 and 904, respectively.

As described above, when an object is moved with respect to the focal region, the projection relationship between the reflected light beam changes. When the projection relationship changes, locations of the beam spots on the detector surfaces move in a predetermined manner. The change in location by each beam spot may be used to determine a degree-of-focus of the object, a working distance from the lens to the object, or a surface profile of the object. More specifically, the change in spot location for each reflected beam may be used to determine relative separation between the reflected light beams 902 and 904. In the first embodiment, the beam spots 922 and 924 move in a similar manner as described with respect to the beam spots 270 and 272 in FIGS. 4-9.

In a second embodiment shown in FIG. 10, the reflected light beam 902 may have an optical path 932 where the beam is reflected, separately, by an optical component 933 and is incident upon a spot detector 936. The reflected light beam 904 may have an optical path 934 in which the beam is reflected, separately, by an optical component 935 and is incident upon a spot detector 938. The spot detectors 936 and 938 have a known spatial relationship with respect to each other. The spot detectors 936 and 938 directly face each other.

As shown, each of the spot detectors 936 and 938 may detect a corresponding beam spot 942 and 944 from the reflected light beams 902 and 904, respectively. In the second embodiment, the beam spots 942 and 944 move in a common direction when the projection relationship of the reflected light beams 902 and 904 changes. Relative separation may be determined as a function of the distance and direction moved by the beam spots 942 and 944.

The second embodiment may be used in optical systems where, for example, system space is limited or restricted. Furthermore, the second embodiment may be used when it is desirable to equalize optical path lengths of the reflected light beams 930 and 932. For example, the optical components 933 and 935 may be located different distances $D_2$ and $D_3$ away from the corresponding spot detectors 936 and 938 to equalize the optical path lengths. In alternative embodiments, optical systems may have different configurations of spot detectors as shown in FIG. 10. For example, in one embodiment, the optical system may have spot detectors 918 and 936. Accordingly, optical systems may determine relative separation based not only on spot locations on one or more spot detectors, but also upon the spatial relationships between the spot detectors.

Figure 11:
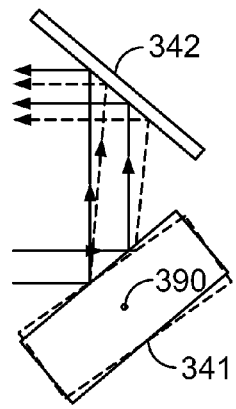
FIG. 11 illustrates reflection of parallel reflected light beams by two optical components where one of the optical components is not in a desired position.

FIGS. 11-14 illustrate an effect on reflected light beams by two optical components when one of the optical components is mispositioned. Throughout the lifetime of an optical system, various optical components used by the focusing mechanism may shift, rotate, or otherwise be moved from a desired or preset position. As shown in FIG. 11, optical components 341 and 342 are positioned relative to each other and are configured to facilitate redirecting reflected light beams toward a detector surface 364 (shown in FIG. 12). The optical component 341 is shown in both a desired position (indicated by solid lines) and in a misoriented position (indicated by dashed lines) where the optical component 341 is rotated about an axis 390. The reflected light beams are shown in a desired optical path (indicated by solid lines) and in an optical path (indicated by dashed lines) in which the optical component 341 has been slightly rotated.

Figure 12:
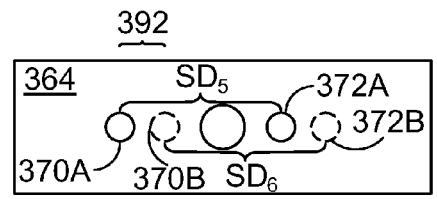
FIG. 12 illustrates beam spots on a detector surface that are provided by the reflected light beams shown in FIG. 11.

FIG. 12 illustrates beam spots 370 and 372 on a detector surface 364 that are provided by the different sets of reflected light beams shown in FIG. 11. Beam spots 370A and 372A illustrate a relative location of the beam spots when the optical components 341 and 342 are properly positioned. Beam spots 370B and 372B illustrate a relative location of the beam spots when the optical components 341 and 342 are not properly positioned. The beam spots 370A and 372A have a separation distance $SD_5$, and the beam spots 370B and 372B have a separation distance $SD_6$. As shown, the separation distances $SD_5$ and $SD_6$ are substantially equal. The separation distances $SD_5$ and $SD_6$ are substantially equal because each reflected light beam is similarly affected by the optical component 341. As such, the separation distance SD may be maintained even when one of the optical components is mispositioned.

However, as shown in FIG. 12, the pair of beam spots 370B and 372B have been shifted a lateral offset 392 due to the movement of the optical component 341 from the desired position. The computing system can be configured to determine focus based on relative separation (e.g., separation distance) between beam spots 370B and 372B, independent of the offset. The computing system may determine that the beam spots 370 and 372 have been shifted together from desired locations. For example, the computing system may determine a common drift by the beam spots 370 and 372 in which the beam spots have moved in a common direction and distance away from an original or a desired location. Such information can be used as a system diagnostic, for example, alerting the computing system that at least one of the optical components has moved from the desired position(s).

Figure 13:
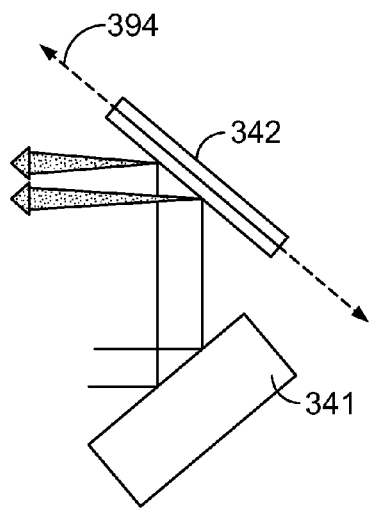
FIG. 13 illustrates reflection of parallel reflected light beams by two optical components where one of the optical components is not in a desired position.
Figure 14:
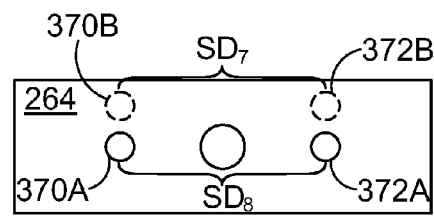
FIG. 14 illustrates beam spots on a detector surface that are provided by the reflected light beams shown in FIG. 13.

As shown in FIG. 13, the optical components 341 and 342 are positioned relative to each other and are configured to facilitate redirecting reflected light beams toward a detector surface 364 (shown in FIG. 14). The optical component 342 is shown in a misoriented position where the optical component 342 has been rotated about an axis 394 from the position shown in FIG. 10. As shown, the reflected light beams are reflected by the optical component 342 such that the light beams project at an angle away from the plane of the page.

FIG. 14 illustrates the beam spots 370 and 372 on the detector surface 364 that are provided by the reflected light beams shown in FIG. 13. Beam spots 370A and 372A illustrate a relative location of the beam spots when the optical components 341 and 342 are properly positioned. Beam spots 370B and 372B illustrate a relative location of the beam spots when the optical components 341 and 342 are not properly positioned. The beam spots 370A and 372A have a separation distance $SD_7$, and the beam spots 370B and 372B have a separation distance $SD_8$. As shown, the separation distances $SD_7$ and $SD_8$ are substantially equal. The separation distances $SD_7$ and $SD_8$ are substantially equal because each reflected light beam is similarly affected by the optical component 342. Similarly, the pair of beam spots 370B and 372B has been shifted by a vertical offset 396 due to the movement of the optical component 341 from the desired position.

The computing system may determine that the beam spots 370 and 372 have been shifted together from desired locations. For example, the computing system may determine a common drift by the beam spots 370 and 372 in which the beam spots have moved in a common direction and distance away from an original or a desired location. Such information can be used for system diagnostics to identify that components are misaligned and in some embodiments to indicate the nature or type of misalignment.

As illustrated by the examples shown in FIGS. 11 through 14, an advantage of particular embodiments of the invention is that focus can be determined independent of misalignment of optical components. In contrast, many other focusing systems that rely on location of a beam spot relative to a fixed location can be subject to error due to misalignment of optical components. This can in turn require an undesirable level of attention to system calibration than necessary for embodiments of the present invention. Similarly the working distance between an objective lens and an object can be determined independent of such misalignment of optical components.

In some embodiments, one or more of the optical components in the optical train may be selectively moved. For example, if the pair of beam spots 370 and 372 were to drift so much that one or more of the beam spots is undetectable, the optical system could selectively move at least one of the optical components 341 to 342 to move the pair of beam spots to an acceptable position. The optical components 341 and 342 could be at least one of rotated or shifted to a different position.

Furthermore, in alternative embodiments, one or more of the optical components could be selectively moved to redirect the reflected light beams to a different detector. For example, if the reflected light beams require a different type of detection or a different sized detector surface due to a change in conjugate lenses, one or more of the optical components could be moved to change the optical track and direct the reflected light beams to a different detector.

With reference to the illustrated embodiment shown in FIGS. 4-9, the incident light beams 230A and 232A are equally off-center from the optical axis 252. However, in alternative embodiments, the incident light beams 230A and 232A may be located at different positions. For example, the incident light beam 230A may be located a greater distance or spacing from the optical axis 252 than the incident light beam 232A. In such embodiments, the beam spots 270 and 272 may still be used to determine separation distance. However, due to the different spacings from the optical axis 252, the beam spots 270 and 272 may have position changes of different magnitude on the detector surface 264. For example, the beam spot 270 may move a larger distance on the detector surface 264 than the distance moved by beam spot 272 on the detector surface 264. Nevertheless, the expected difference in the magnitude of change can be taken into account in order to accurately determine degree of focus or working distance for the optical system based on the relative separation between beam spot 270 and beam spot 272.

In other embodiments, one of the incident light beams may coincide with the optical axis 252 while the other light beam is spaced apart from and propagates along the optical axis 252. In such embodiments, the incident light beam that is spaced apart from the optical axis will move when the object is moved out of focus as described above. However, the beam spot corresponding to the incident light beam that coincides with the optical axis 252 will not move on the detector surface 264 when the object is moved out of focus. Nonetheless, changes in the relative separation between the beam spots can be used to determine degree of focus or working distance for the optical system. Furthermore, changes in the position of the optical components (e.g., rotation, drift) or other adverse affects can cause both beam spots to move. In this embodiment, movement of the beam that coincides with the optical axis will be indicative of the altered alignment of the optical components and will be distinguishable from a change in focus or a change in working distance between the lens and object being viewed. The distinction can be made because a change in focus or working distance would not cause movement of the beam that coincides with the optical axis absent a change in alignment of components. Thus, use of a beam that coincides with the optical axis can be advantageous in providing diagnostic information about alignment of the optical system in addition to providing information about the degree of focus or working distance between an objective lens and an object being viewed.

Figure 15:
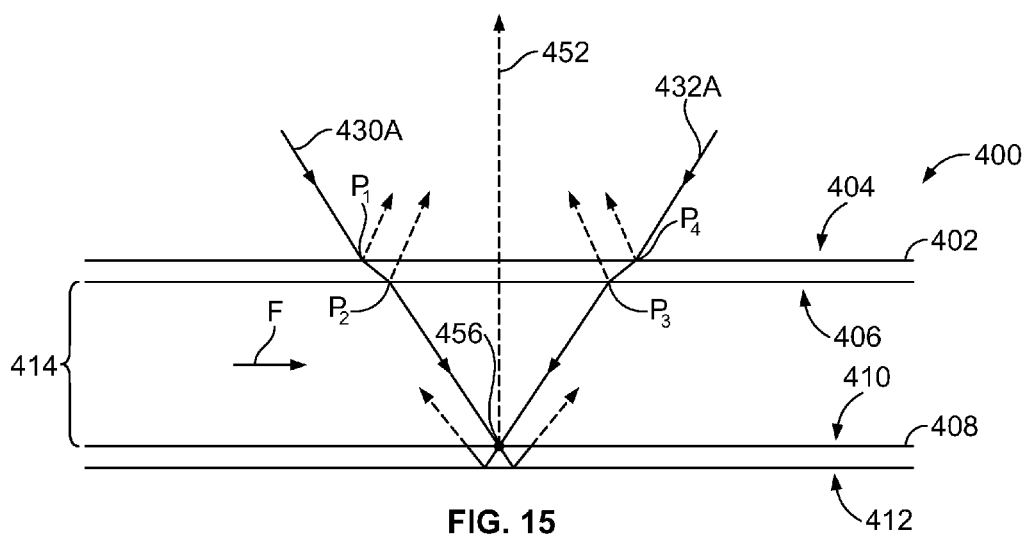
FIG. 15 is a side view of a flow cell that may be used in various embodiments and illustrates reflection of incident light beams.

FIG. 15 is a side view of a flow cell 400 that may be used in various embodiments. When the object includes a flow cell or other optical substrates having multiple layers of different refractive index, the incident light beams may be reflected at multiple points within the flow cell. For example, the flow cell 400 includes a cover slip or top layer 402 having opposite surfaces 404 and 406 and a bottom layer 408 having opposite surfaces 410 and 412. As shown, the top and bottom layers 402 and 408 have a flow channel 414 of the flow cell 400 extending therebetween. The flow channel 414 may include a fluid F flowing therethrough. When incident light beams 430A and 432A are directed toward a focal region 456 within or along the flow cell 400, the incident light beams 430A and 432A may be reflected by the flow cell 400 at multiple points P along an optical axis 452 of the lens (not shown). For example, if the optical assembly is configured to scan the surface 410 of the bottom layer 408, the incident light beams 430A and 432A are reflected at reflection points $P_1$-$P_4$ prior to reaching the focal region 456. Such reflection provides unwanted reflected light beams (indicated by dashed lines). The unwanted reflected light beams may be detected by a focus detector (not shown).

Accordingly, in some embodiments, an optical assembly may include a range limiter, such as the range limiter 254 shown in FIGS. 2 and 3. Range limiters include slits or openings that filter or remove the unwanted reflected light beams from the output light so that the focus detector does not misinterpret the light signals that impinge on the surface of the focus detector. The ranger limiter 254 may be configured to filter out reflected light beams that are not within, for example, +/−20 um from the focal region 456. The range limiter includes one opening for each reflected light beam, such as the reflected light beams 230B and 232B shown in FIGS. 2 and 3. Furthermore, reflected light beams that diverge or converge at an excessive angle may also be filtered out by the ranger limiter.

FIGS. 16A and 16B illustrate alternative optical assemblies 850 and 880. In various embodiments, optical systems described herein may use a plurality of pairs of incident light beams. For example, the optical assembly 850 includes a conjugate lens 854 and optical components 860 and 862 to deliver and receive light beams as described herein to facilitate imaging/scanning/profiling an object 852. The optical component 860 is configured to direct a first pair of parallel incident lights beams 870 and 872 parallel to an optical axis 875 of the lens 854 such that the first pair of incident light beams 870 and 872 are directed toward a focal region 856A located on the optical axis 875. The optical component 862 is configured to direct a second pair of parallel incident lights beams 874 and 876 to the lens 854 at a non-orthogonal angle with respect to the optical axis 875 such that the second pair of incident light beams 874 and 876 are directed toward a focal region 856B located at a different location on the focal plane.

FIG. 16B illustrates the optical assembly 880, which includes a conjugate lens 882 and a common optical component 884. The optical component 884 is configured to direct multiple pairs of incident light beams to a conjugate lens 886. In the illustrated embodiment, the optical component 884 is a beam generator such as those described above. Although not shown, the optical component 884 may receive separate light beams from separate light sources in which the light beams are incident upon the optical component 884 at different angles. As such, the optical component 884 may generate first and second pairs 890 and 892 of incident light beams that are non-parallel with respect to each other. As described above with respect to FIG. 16A, the first and second pairs 890 and 892 of incident light beams are directed toward separate focal regions 888A and 888B located on a common focal plane.

The optical assemblies 850 and 880 may be used in various optical systems for various purposes. In both optical assemblies 850 and 880, beam spots corresponding to the reflected light beams may be detected and relative separation for each pair of reflected light beams can be determined. By determining if the different pairs of incident light beams are in focus with the object, such optical systems can determine an angle of the object with respect to the optical axis of the lens or any other reference axis. Thus, the information can be used to determine whether the object is tilted or has changed orientation. Furthermore, multiple pairs of incident light beams may be used as a redundant mechanism for surface profiling or determining a working distance between the lens and the object. Although the optical assemblies 850 and 880 show only two pairs of incident light beams, more than two pairs may be used. In particular embodiments, it may be advantageous to use at least 3 pairs of incident beams or to use at least 4 pairs of incident beams. The multiple focal regions may be aligned linearly or positioned non-linearly so as to define a two-dimensional geometric shape on the object.

Information regarding the angle or orientation of an object can be processed by a system controller of an optical system to adjust the angle of the object. The angle can be adjusted to achieve a desired tilt or angle for an object. For example, the angle of a flat object can be adjusted so that it is closer to being orthogonal to the optical axis of an objective lens used for imaging the object. Thus, an optical system can be configured to adjust an object to position a planar surface of the object to be orthogonal to the optical axis of a lens that is used to image the surface.

Figure 17:
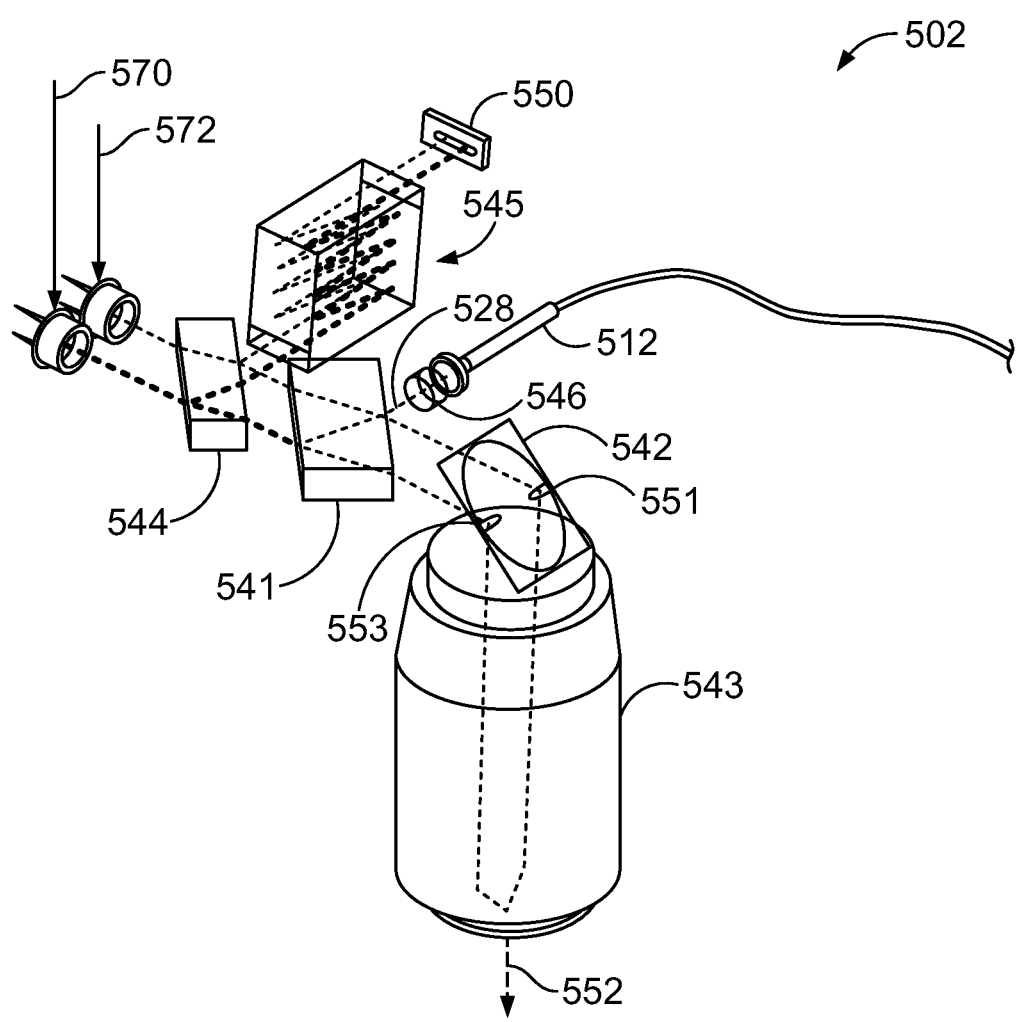
FIG. 17 is a perspective view of an optical assembly formed in accordance with another embodiment that may be used with the optical system shown in FIG. 1.
Figure 18:
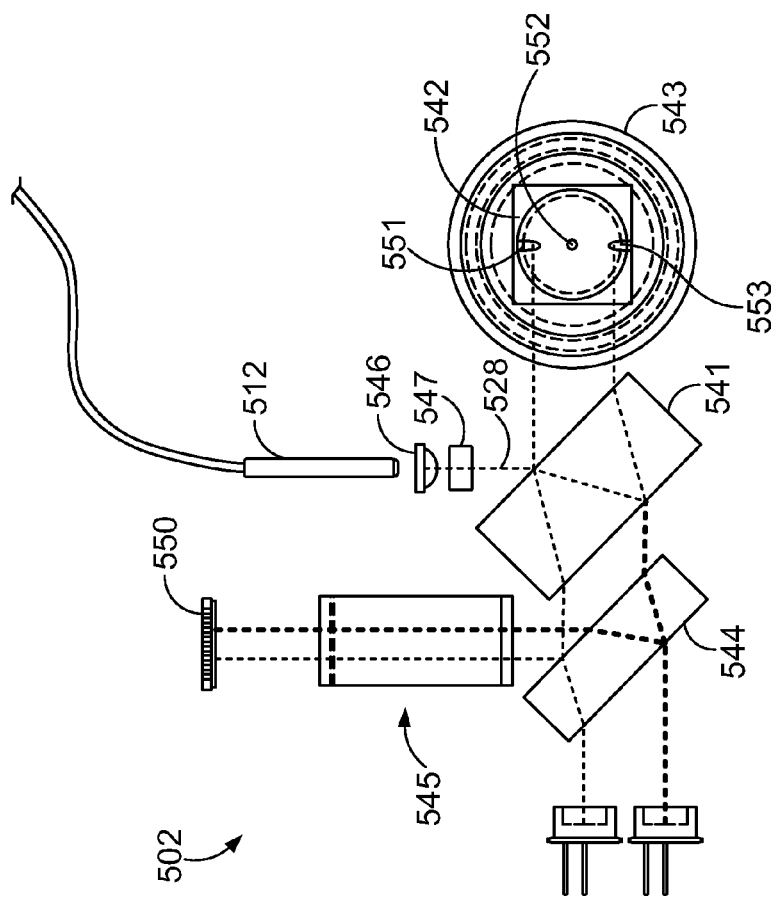
FIG. 18 is a plan view of the optical assembly shown in FIG. 17.

FIGS. 17 and 18 are perspective and plan views, respectively, of an optical assembly 502 formed in accordance with another embodiment. The optical assembly 502 may be used with various optical systems, such as the optical system 100 shown in FIG. 1. As shown, the optical assembly 502 includes an optical train 540 of optical components 541-545 that direct light beams along an optical track between an object of interest (not shown) and a focus detector 550. The series of optical components 541-545 of the optical train 540 include a dual-beam generator 541, an objective focus mirror 542, a conjugate lens 543, a beam combiner 544, and a beam folding device 545.

The optical assembly 502 includes a reference light source 512 that provides a light beam 528. In some embodiments, the light beam 528 may first transmit through a collimating lens 546 (FIG. 18) and an optical wedge 547 (FIG. 18). The optical wedge 547 may be rotated for fine adjustment of an optical path of the light beams. As shown in FIGS. 17 and 18, the light beam 528 is incident upon the dual-beam generator 541, which provides a pair of parallel incident light beams as described above. The parallel incident light beams are directed toward the focus mirror 542.

The collimating lens 546 may be used to configure the incident and reflected light beams as desired. For example, the collimating lens 546 may modify the light beam 528 so that the light rays of the incident light beams are not precisely parallel with respect to each other. Furthermore, the light rays may be modified so that the reflected light beams have a minimum diameter at the focus detector 550 when the optical assembly 502 is in focus.

The dual-beam generator 541 directs the parallel incident light beams toward the focus mirror 542. The focus mirror 542 reflects the incident light beams toward the conjugate lens 543. As shown, the focus mirror 542 includes a pair of reflectors 551 and 553 (e.g., aluminized tabs) that are positioned to reflect the incident light beams and the reflected light beams from the object. The reflectors 551 and 553 may function similar to a range limiter in that the reflectors 551 and 553 may be sized to reflect only a limited range of reflected light beams. The focus mirror 542 is positioned to reflect the incident light beams so that the incident light beams propagate parallel to an optical axis 552 of the lens 543. The lens 543 may be a near-infinity conjugated objective lens.

As described above with respect to the optical assembly 202, the reflected light beams may propagate along a substantially equal or overlapping optical path with respect to the incident light beams through the lens 543 to focus mirror 542 which directs the reflected light beam toward the dual-beam generator 541. As shown in FIGS. 17 and 18, the reflected light beams are incident upon and directed by the dual-beam generator 541 toward the beam combiner 544. In the illustrated embodiment, the beam combiner 544 is configured to modify a path spacing that separates the reflected light beams. The path spacing at the beam combiner 544 may be re-scaled to be substantially equal to the separation distance of the reflected light beams at the focus detector 550.

Like the optical train 240 (FIG. 2) described above, the optical train 540 is configured to maintain a projection relationship between the reflected light beams throughout the optical track so that a degree-of-focus may be determined. Also shown in FIGS. 17 and 18, the optical train 540 may include a beam folding device 545. The beam folding device 545 functions to increase an optical path length between the lens 543 and the focus detector 550. The beam folding device 545 may increase the gain and range of the optical assembly 502.

Figure 19:
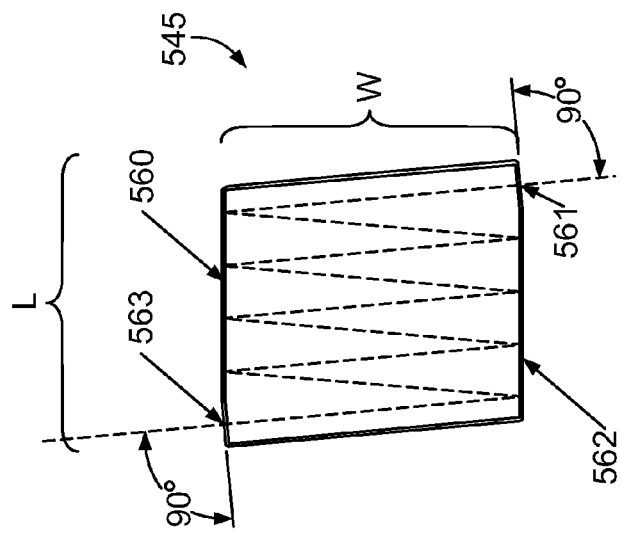
FIG. 19 is a side view of a beam folding device that may be used in accordance with various embodiments.

FIG. 19 is a side view of a beam folding device 545. The beam folding device 545 includes a pair of spaced apart sides 560 and 562. The side 560 includes an inlet window 561 that is sized to receive the reflected light beams from the beam combiner 544. The reflected light beams enter the beam folding device 545 through the inlet window 561 and are repeatedly reflected back and forth between the sides 560 and 562. The sides 560 and 562 may be aluminized to reduce optical losses. The reflected light beams may be transmitted through an outlet window 563 and propagate to the focus detector 550 (shown in FIG. 17).

With each iteration in which the reflected light beams propagate between the sides 560 and 562, an optical path length of the reflected light beams increases a width W of the beam folding device 545. The number of iterations may be based upon an angle of incidence between the reflected light beams and the sides 560 and 562 and a length L of the beam folding device 545. Accordingly, the beam folding device 545 may be sized, shaped, and oriented to provide an increase in the optical path length. Increasing the optical path length, in turn, may function as an amplifier to increase the gain and range of the optical assembly 502.

In the illustrated embodiment, the beam folding device 545 has an optical body having a transparent material. However, in alternative embodiments, the beam folding device 545 may include two opposing mirrors with ambient air therebetween. Furthermore, in the illustrated embodiment, the opposite sides 560 and 562 extend parallel to one another. In alternative embodiments, the beam folding device 545 may include multiple sides or surfaces that may or may not extend parallel to one another. Optionally, the focus detector 550 may be affixed to the beam folding device 545.

Returning to FIGS. 17 and 18, the optical assembly 502 may also include a pair of phase detectors 570 and 572. The phase detectors 570 and 572 are positioned to receive respective portions of the reflected light beams that are transmitted through the beam combiner 544. The phase detectors 570 and 572 may be used in optical systems that continuously scan an object when there is relative motion between the object and conjugate lens in a direction that is orthogonal (or perpendicular) to the optical axis. The phase detectors 570 and 572 detect a phase of the intensity of the reflected light beams to determine, for example, any phase differences that occur between the reflected light beams. Although the exemplary systems in FIGS. 17 and 18 include a combination of a phase detector and a focus detector, it will be understood that either type of detector can be used absent the other.

Figure 20:
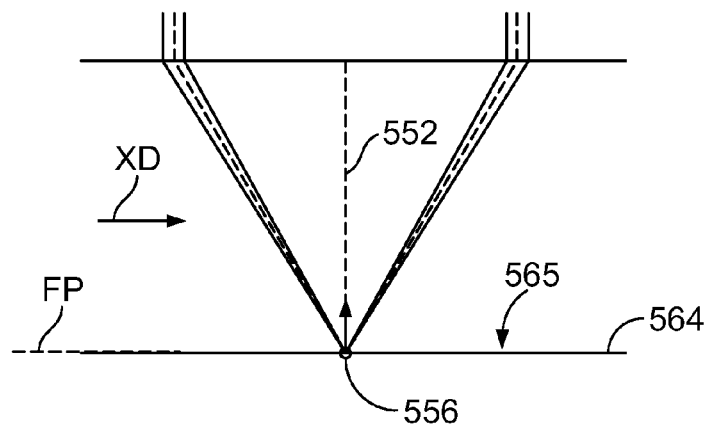
FIGS. 20-22 illustrate an object being scanned by an optical assembly formed in accordance with various embodiments.
Figure 21:
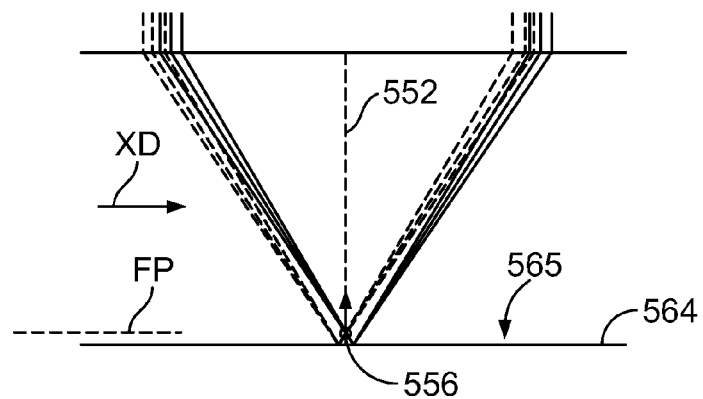
Figure 22:
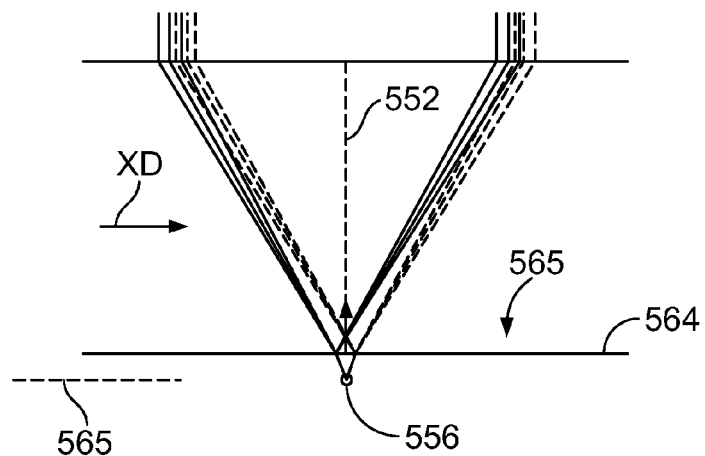

FIGS. 20-22 illustrate an object 564 being scanned by the optical assembly 502 (FIG. 17) while the object 564 is relatively moving in a lateral direction (indicated by the arrow XD) with respect to the lens 543 (FIG. 17). The lateral direction XD is orthogonal to the optical axis 552 of the lens 543. To move the object 564 relative to the lens 543, the object 564 may be moved in the lateral direction XD by a stage controller and/or the lens 543 is moved in a direction opposite to the lateral direction XD. In particular embodiments, the optical assembly 502 may use a differential phase detection mechanism for determining a degree-of-focus. The optical assembly 502 may alternatively or additionally use a differential phase detection mechanism for determining the working distance between object 564 and lens 543. FIG. 20 illustrates the object 564 being in focus with a focal region 556 as the object 564 is moved in the lateral direction XD. If a surface 565 of the object 564 is located within a focal plane FP of the optical assembly 502, the phase detectors 570 and 572 (FIG. 17) will detect a substantially common phase for the reflected light beams 530B and 532B.

FIG. 21 illustrates a scan of the object 564 when the object 564 is below the focal region 556, and FIG. 22 illustrates a scan of the object 564 when the object 564 is above the focal region 556. If the surface 565 of the object 564 is below the focal plane FP as shown in FIG. 21, the phase detectors 570 and 572 will continuously detect a phase differential of the reflected light beams as the optical assembly 502 scans the object 564. The phase differential indicates that the object 564 is below the focal region 556 or focal plane FP. Similarly, if the surface 565 of the object 564 is above the focal plane FP as shown in FIG. 22, the phase detectors 570 and 572 will continuously detect a phase differential of the reflected light beams 530B and 532B. The phase differential indicates that the object 564 is above the focal region 556.

The object 564 in FIGS. 20-22 is scanned with the incident light beams along a substantially flat surface. However, in alternative embodiments, the object may include an array of microparticles or have a surface with relief features such as regions of unevenness (e.g., ruled or grooved surface). As the optical assembly 502 scans the surface of the object, the height or elevation of the detected surface may frequently change due to the microbeads or uneven surface. Depending upon the movement of the object, one reflected light beam may be disturbed (e.g., incident upon a microbead) before the other reflected light beam. In such embodiments, relative positions of the microparticles or other surface features with respect to each other along the surface may also be determined.

Figure 23:
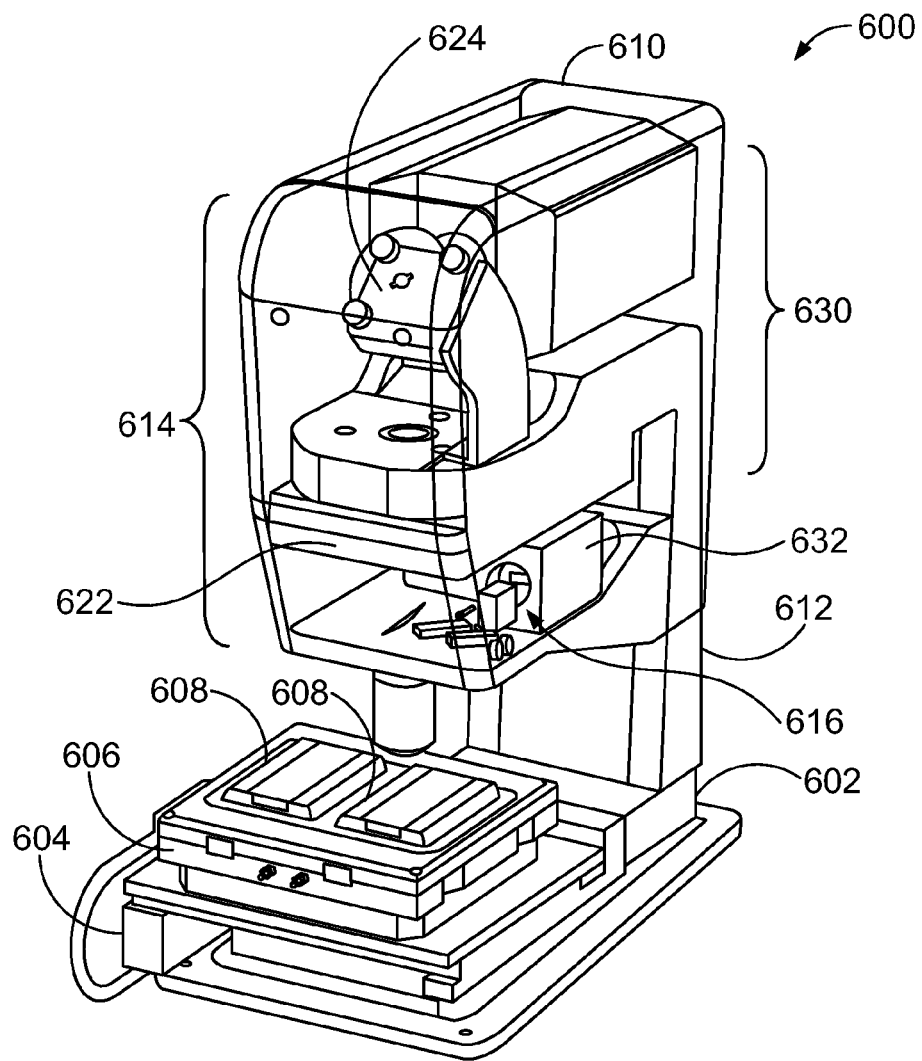
FIG. 23 is a perspective view of a sample imager formed in accordance with one embodiment.

FIG. 23 is a perspective view of a sample imager 600 formed in accordance with one embodiment. The sample imager 600 may have similar features, components, systems, and assemblies as described above with respect to the optical system 100 and the optical assemblies 202 and 502. As shown, the sample imager 600 includes an imager base 602 that supports a stage 604 having a sample holder 606 thereon. The sample holder 606 is configured to support one or more samples 608 during an imaging session. The samples 608 are illustrated as flow cells in FIG. 23. However, other samples may be used.

The sample imager 600 also includes a housing 610 (illustrated in phantom) and a strut 612 that supports the housing 610. The housing 610 can enclose at least a portion of an optical assembly 614 therein. The optical assembly 614 may include a focus assembly 616 and a sample-detecting assembly 630. The focus assembly 616 may be similar to the optical assembly 502 described above. For example, the focus assembly 616 may include an auto-focus line scan camera 620 that receives reflected light beams for determining a degree-of-focus of the sampler imager 600. The sample imager 600 may also include a filter wheel 622 and an alignment mirror 624 that directs light toward a sample detector 632, which is shown as a K4 camera in FIG. 23.

Figure 24:
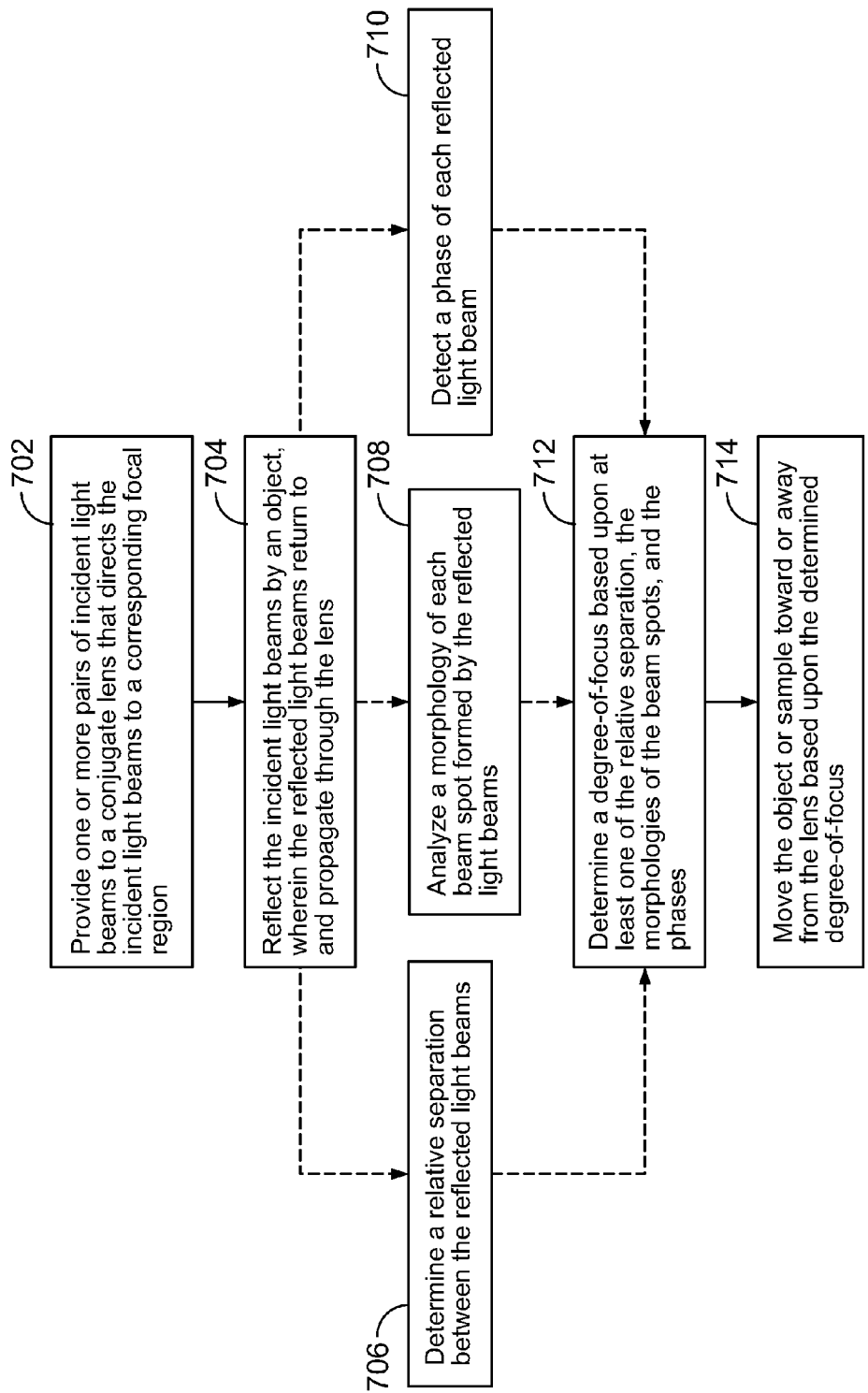
FIG. 24 is a block diagram that illustrates a method of determining a degree-of-focus of an object with respect to an optical assembly.

FIG. 24 is a block diagram that illustrates a method 700 of determining a degree-of-focus of an object with respect to an optical assembly. The method 700 may be performed by various optical systems, such as those described herein. The method 700 includes providing at 702 a pair of incident light beams to a conjugate lens. The conjugate lens may be near-infinite lens as described above with respect to the lenses 243 and 543. The incident light beams can be directed to propagate through the lens parallel to an optical axis of the lens and are directed by the lens to converge toward a focal region. At 704, the incident light beams are reflected by the object that is positioned proximate to the focal region. The reflected light beams return to and propagate through the lens. In various embodiments, the method may include one or more manners of determining a degree-of-focus of the optical assembly with respect to the object based upon relative characteristics of the reflected light beams as indicated by three exemplary options 706, 708 and 710 shown in FIG. 24.

For instance, the method 700 may include determining at 706 a separation distance that is measured between the reflected light beams. For example, the reflected light beams may be incident upon a detector surface and form beam spots thereon. The detector may communicate data relating to the detected beam spots to a computing system, such as the computing system 120. The computing system may include a focus-control module that analyzes the beam spots. For example, the focus-control module may determine a centroid of each beam spot and then calculate a separation distance measured between the beam spots.

In addition to (or alternatively) determining the separation distance of the beam spots, the method 700 may include analyzing at 708 a morphology (e.g., size, shape, and density) of each beam spot. The morphology of each beam spot may change due to the degree-of-focus of the optical assembly or due to imperfections, such as dirt or bubbles, that interfere with the reflected light beams. For example, as described above, the beam spots may have different airy radiuses based upon whether the object is in focus, below focus, or above focus.

In addition to (or alternatively) determining the separation distance and morphologies of the beam spots, the method 700 may include at 710 detecting a phase of each of the reflected light beams. A portion of each reflected light beam may be incident upon and detected by a corresponding phase detector. The phase detector detects a phase of the corresponding reflected light beam.

The method also includes determining at 712 a degree-of-focus of the optical assembly with respect to the object based upon at least one of the separation distance of the beam spots, the beam spot morphologies, and a comparison of the phase measurements. In particular embodiments, the degree-of-focus is only determined by the separation distance of the beam spots. In other embodiments, the degree-of-focus is only determined by comparing the detected phases of the reflected light beams.

At 714, the object may be moved in a direction toward or away from the lens based upon the degree-of-focus. For example, the object may be moved to improve the degree-of-focus. In some embodiments, the object is moved in a direction toward or away from the lens based upon the relative locations of the beam spots on a detector surface as described above. In some embodiments, the object is moved in a direction based upon a comparison of the phase measurements.

In alternative embodiments, the operations of the method 700 may be used to determine characteristics of a surface of an object. For example, various optical systems and assemblies may use the determined separation distance or the detected phase measurements to determine a height of surface. For example, a height of various elements of a semiconductor device that are mounted or deposited onto a surface of the device may be determined. Relative positions of the various elements may also be determined by scanning the surface at a predetermined rate.

Figure 25:
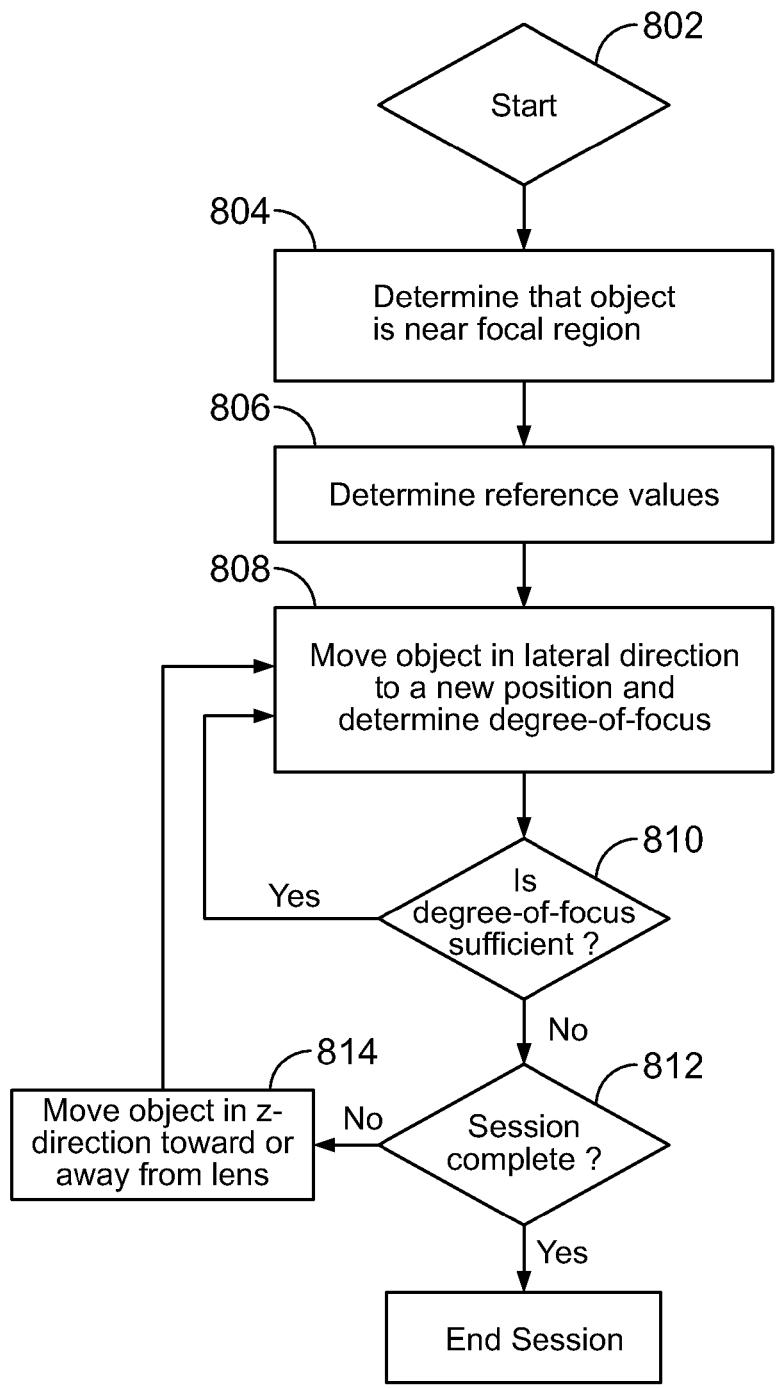
FIG. 25 is a block diagram illustrating a control loop for controlling a degree-of-focus of an optical system with respect to an object or sample.

FIG. 25 is a block diagram illustrating a control loop for controlling a degree-of-focus of an optical system with respect to an object. At 802, an imaging session may be started. At 804, the optical system establishes that an object, which may include an object as described above, is positioned near a focal region of a conjugate lens of the optical system. The optical system may reflect incident light beams with the object as described above.

Optionally, at 806, the optical system may determine reference values or standards to facilitate determining whether the optical system is in focus. For instance, the object may be moved in a Z-direction toward and away from the lens while detecting relative characteristics of the reflected light beams. The optical system can detect beam spots from the reflected light beams on a detector surface and record the relative positions of the beam spots as the object is moved from an above-focus position through the focal plane and into a below-focus position. For example, the beam spots may have a particular separation distance and spot morphologies when the object is located a known distance above the focal plane, at the focal plane, and a known distance below the focal plane, respectively. The desired separation distance may also be based upon (or a function of) dimensions of a dual-beam generator that provides parallel incident light beams or, alternatively, a beam combiner that re-scales a path spacing of the reflected light beams. The optical system may also determine reference values or standards based upon detected phase measurements of the reflected light beams as described above.

At 808, the object is relatively moved to a new position and a degree-of-focus is measured at the new position. The optical system at 810 may query whether the calculated degree-of-focus is sufficient. If the calculated degree-of-focus is sufficient, the optical system moves the object to a new position at 808. If the calculated degree-of-focus is not sufficient, the optical system queries at 812 whether the imaging session has completed. For example, if the object has moved laterally beyond the focal region, a null score may be determined by the optical system. If the imaging session is not completed, the optical system at 814 moves the object in a Z-direction toward or away from the lens. The direction may be based upon the relative characteristics determined by the optical system. For example, if the relative locations of the beam spots indicate the object is below focus, the object may be moved vertically upward toward the focal plane. An amount of movement may also be a function of the relative characteristics. Optionally, the optical system may re-determine the new degree-of-focus at the new Z-position before moving to a new lateral position to confirm that the degree-of-focus is sufficient. The optical system then moves at 808 the object to a new lateral position.

Figure 26:
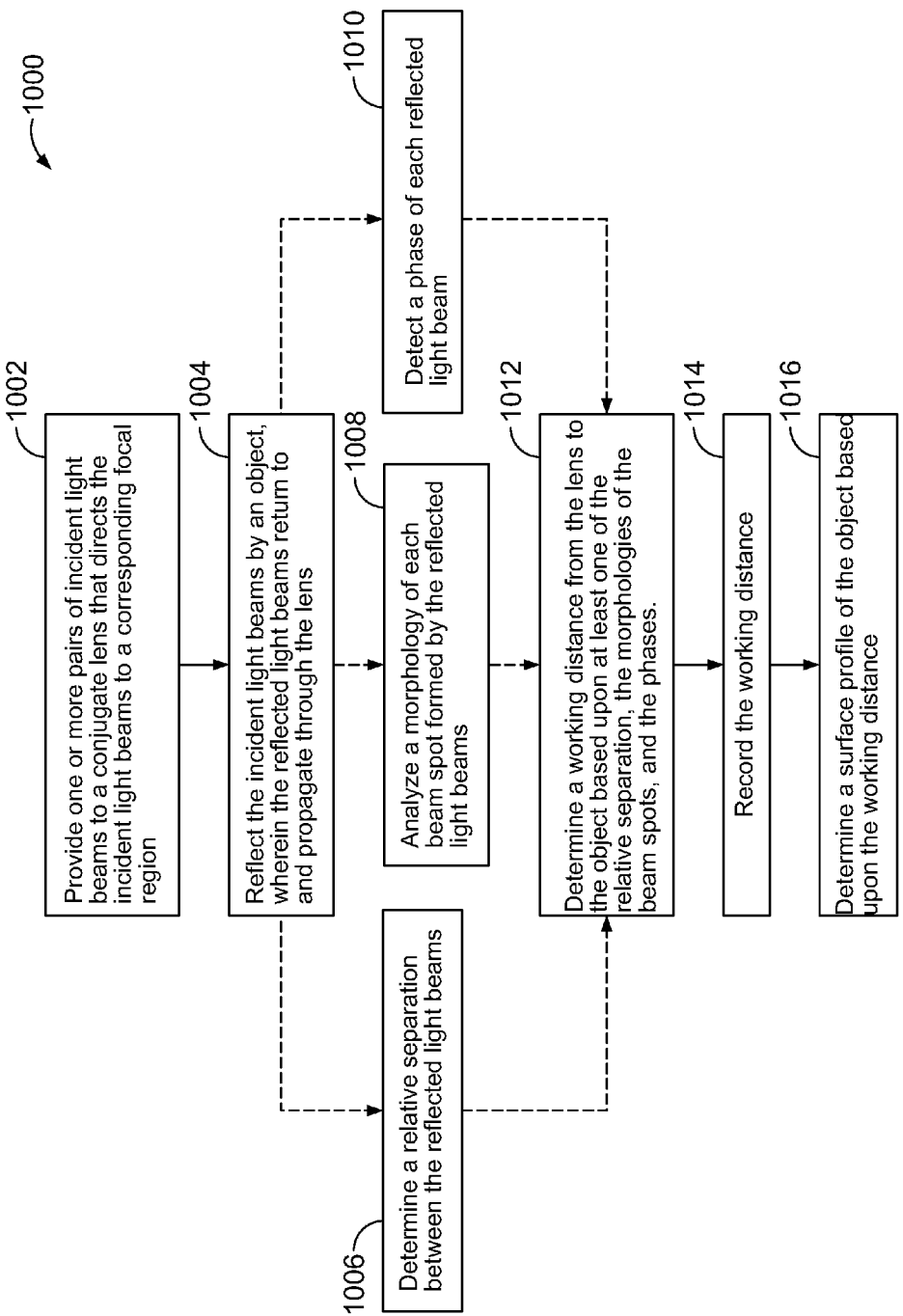
FIG. 26 is a block diagram that illustrates a method of determining a working distance between an object and a conjugate lens of an optical assembly.

FIG. 26 is a block diagram that illustrates a method 1000 of determining a working distance between an object and a conjugate lens of the optical assembly. The working distance may then be used to determine degree-of-focus or a surface profile of an object. The method 1000 may be performed by various optical systems, such as those described herein. The method 1000 includes providing at 1002 a pair of incident light beams to a conjugate lens. The conjugate lens may be near-infinite lens as described above with respect to the lenses 243 and 543. The incident light beams can be directed to propagate through the lens parallel to an optical axis of the lens. The lens directs the incident light beams to converge toward a focal region. At 1004, the incident light beams are reflected by the object that is positioned proximate to the focal region. The reflected light beams return to and propagate through the lens.

For instance, the method 1000 may include determining at 1006 a relative separation that is measured between the reflected light beams. For example, the reflected light beams may be incident upon one or more detector surfaces and form beam spots thereon. The detector(s) may communicate data relating to the detected beam spots to a computing system, such as the computing system 120. The computing system may include a module that analyzes the beam spots as described above. In addition to (or alternatively) determining the relative separation of the beam spots, the method 1000 may include analyzing at 1008 a morphology (e.g., size, shape, and density) of each beam spot. Furthermore, in addition to (or alternatively) determining the relative separation and morphologies of the beam spots, the method 1000 may include at 1010 detecting a phase of each of the reflected light beams. A portion of each reflected light beam may be incident upon and detected by a corresponding phase detector. The phase detector detects a phase of the corresponding reflected light beam.

The method also includes determining at 1012 a working distance of the optical assembly with respect to the object based upon at least one of the relative separation between the reflected light beam, the beam spot morphologies, and a comparison of the phase measurements. At 1014, a computing system records the working distance at the particular location with respect to the object. At 1016, the computing system may determine a surface profile of the object based upon the working distances determined by the optical system. Alternatively or additionally, a computing system may determine an angle of the surface of the object with respect to the optical axis of the objective lens. The computing system can be further configured to instruct the optical system to adjust the relative angle between the surface of the object and the optical axis to achieve a desired tip or tilt or orientation. For example, an adjustment can be made to position the surface of the object to be orthogonal to the optical axis of the objective lens.

Figures 27, 28:
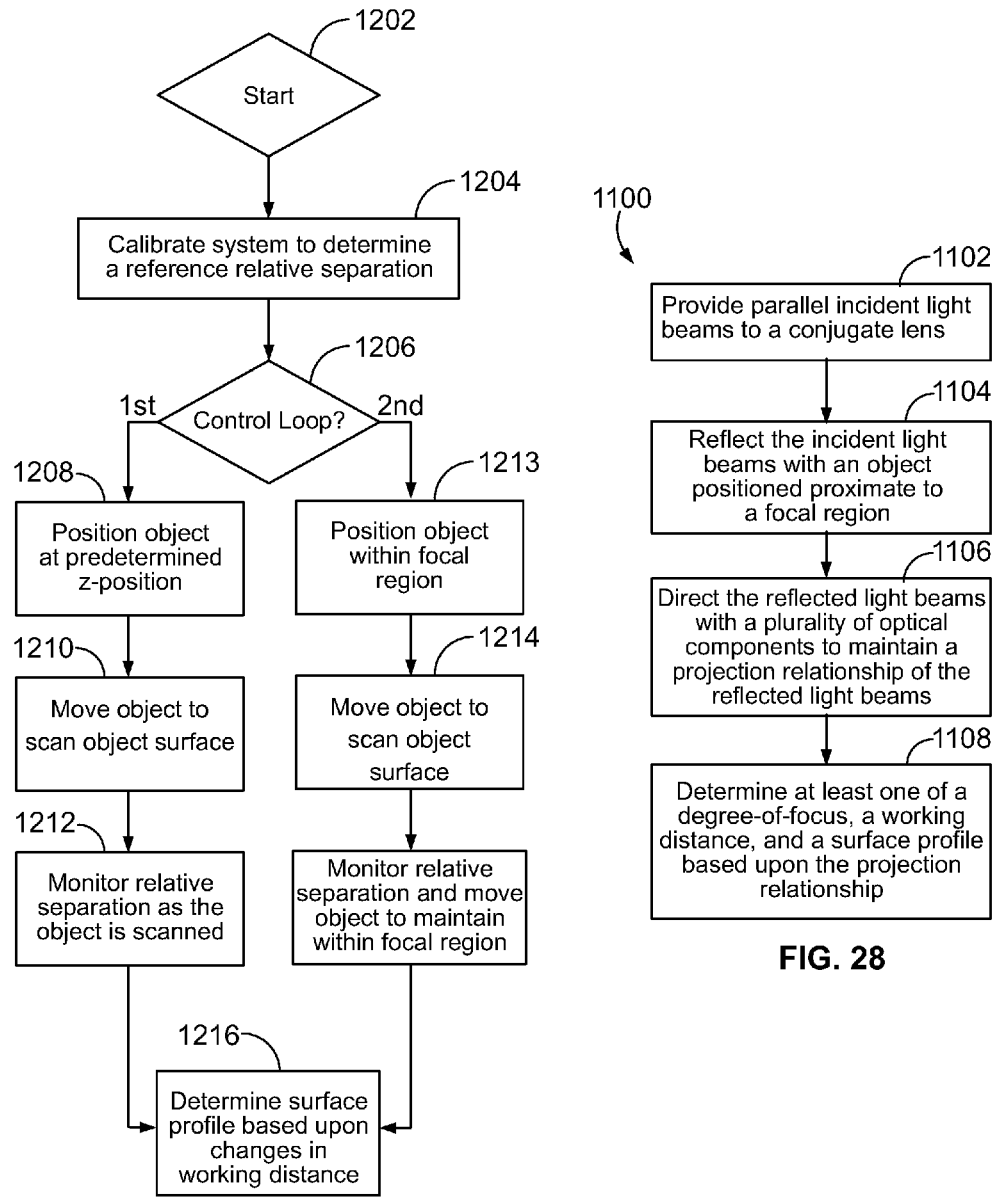
FIG. 27 is a block diagram illustrating a control loop for profiling an object surface.
FIG. 28 is a block diagram that illustrates a method of operating an optical system in accordance with various embodiments.

FIG. 27 is a block diagram illustrating control loops for operating an optical system in accordance with various embodiments. At 1202, a profile determining session of an object may be started. The object may be, for example, a flow cell or a semi-conductor chip. At 1204, the optical system may be calibrated to determine a reference relative separation that represents when the object is within the focal region. For example, the object may be imaged as the object is moved along the z-axis to and from the lens as described above. Image analysis may determine a reference degree-of-focus or reference working distance from the lens. In another embodiment, the lens may be replaced with a mirror. As such, the determined relative separation of the reflected light beams may function as a reference relative separation that identifies when the object is within the focal region.

At 1206, the optical system may query a user as to which control loop to perform. A first control loop may be selected by the user. The first control loop may be an "open loop" system where the object holder positions at 1208 the object at a predetermined z-position. At 1210, at least one of the optical assembly and the object holder may be moved in a direction that is perpendicular to the optical axis of the lens. In particular embodiments, for example, those using multiple pairs of incident beams such as shown in FIGS. 16A and 16B, the holder can be moved to adjust the tip or tilt of the object. At 1212, the optical system monitors the relative separation as the optical system scans the surface. For example, the optical system may record a relative separation for a series of data points and associate each data point with a position along the surface. When the working distance decreases (i.e., when the height of the object surface increases) the relative separation may increase as shown in FIG. 9. When the working distance increases (i.e., when the height of the object surface decreases) the relative separation may decrease as shown in FIG. 7. Accordingly, a surface profile or topography of the object may be determined.

The user may also select a second control loop. The second control loop may be a "closed loop" system where the optical system is configured to move the object holder so that the object is maintained within the focal region. At 1213, the object is positioned within the focal region. At 1214, at least one of the optical assembly and the object holder may be moved in a direction that is perpendicular to the optical axis of the lens. In particular embodiments, for example, those using multiple pairs of incident beams such as shown in FIGS. 16A and 16B, the holder can be moved to adjust the tip or tilt of the object. At 1216, the optical system monitors the relative separation as the optical system scans the surface. When the object is moved out of the focal region or is no longer sufficiently within focus, the optical system may move the object in the z-direction to remain within the focal region. For example, if the relative separation changes from the reference relative separation, the object holder may move the object in a direction that is based upon the changing relative separation. When the optical system moves the object holder, the optical system records the distance that the object was moved. The recorded distance is indicative of the changing profile. When the working distance decreases (i.e., when the height of the object surface increases) the optical system moves the object away from the lens. When the working distance increases (i.e., when the height of the object surface decreases) the optical system moves the object toward the lens.

Accordingly, during the first and second control loops, optical systems described herein may monitor the relative separation of the object as the object is scanned. The optical system can record a change in working distance, which indicates a change in the surface profile or topography of the object. At 1216, the optical system may determine a surface profile based upon the changes in working distance.

FIG. 28 is a block diagram of a method 1100 of operating an optical system, such as the optical systems described above. The method 1100 includes providing at 1102 at least one pair of parallel incident light beams to a conjugate lens. The pair of parallel incident light beams may propagate parallel to the optical axis of the lens or form a non-orthogonal angle relative to the optical axis. At 1104, the incident light beams are reflected by an object positioned proximate to a focal region. The reflected light beams return to and propagate through the lens. The reflected light beams have a projection relationship determined by the position of the object with respect to the focal region.

The method 1100 also includes, at 1108, directing the reflected light beams with a plurality of optical components. The optical components may be sized, shaped, and positioned with respect to each other to maintain the projection relationship. For example, each optical component may include one of a common planar surface that reflects both reflected light beams or first and second parallel surfaces that each reflects one of the reflected light beams. At 1108, at least one of a degree-of-focus, a working distance, and a surface profile of an object may be determined based upon the projection relationship. The degree-of-focus, working distance, and the surface profile may be determined by a relative separation of the reflected light beams as describe above.

Accordingly, embodiments described herein may include methods and various optical systems and assemblies that control focus by reflecting incident light beams with an object and using relative positions, orientations, and characteristics of the reflected light beams to determine a degree-of-focus or a working distance between the lens and the object.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the specific components and processes described herein are intended to define the parameters of the various embodiments of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A method for controlling focus of an optical system, the method comprising:
   providing a pair of incident light beams to a conjugate lens, the incident light beams being directed by the lens to converge toward a focal region;
   reflecting the incident light beams with an object positioned proximate to the focal region, the reflected light beams returning to and propagating through the lens;
   detecting a phase of each of the reflected light beams; and
   determining a degree-of-focus of the optical system with respect to the object by comparing the phases of the reflected light beams.

2. The method of claim 1, wherein the incident light beams propagate parallel to each other when received by the lens.

3. The method of claim 1, wherein the determining of the degree-of-focus comprises determining that the object is above or below the focal region when the phase of one of the reflected light beams changes before the phase of the other reflected light beam.

4. The method of claim 3, further comprising moving at least one of the lens and the object to adjust a relative position of the lens and the object with respect to each other based on the determining that the object is above or below the focal region.

5. The method of claim 1, wherein the providing operation includes providing a single light beam to a dual-beam generator that provides the pair of incident light beams.

6. The method of claim 5, wherein the dual-beam generator has first and second parallel surfaces, the dual-beam generator reflecting and refracting portions of the single incident light beam to generate the pair of incident light beams.

7. The method of claim 1, wherein the incident light beams are reflected by the object at multiple points along an optical axis of the lens, the method further comprising filtering the reflected light beams so that the phases of a predetermined pair of reflected light beams are detected.

8. The method of claim 1, wherein the phases of the reflected light beams are detected as the object is moving in a lateral direction with respect to the lens.

9. The method of claim 1, wherein the object is a sample comprising biological or chemical substances.

10. The method of claim 1, wherein the pair of incident light beams is a first pair of incident light beams, the providing operation further comprising providing a second pair of incident light beams to the conjugate lens, the first pair of incident light beams propagating through the conjugate lens at a first angle with respect to an optical axis and the second pair of incident light beams propagating through the conjugate lens at a different second angle with respect to the optical axis.

11. An optical system comprising:
   a reference light source configured to provide a pair of incident light beams;
   a conjugate lens positioned to receive the incident light beams, the lens directing the incident light beams to a focal region;
   an object holder configured to hold an object with respect to the focal region, the object reflecting the incident light beams so that the reflected light beams return to and propagate through the lens;
   a pair of phase detectors, each phase detector detecting a phase of one of the reflected light beams; and
   a focus-control module configured to determine a degree-of-focus by comparing the phases of the reflected light beams.

12. The optical system of claim 11, wherein the incident light beams propagate parallel to each other when received by the lens.

13. The optical system of claim 11, wherein the focus-control module is configured to determine that the object is above or below the focal region when the phase of one of the reflected light beams changes before the phase of the other reflected light beam.

14. The optical system of claim 11, further comprising a dual-beam generator that receives a single light beam from the reference light source, the dual-beam generator providing the pair of incident light beams from the single light beam.

15. The optical system of claim 14, wherein the dual-beam generator includes an optical body having first and second parallel surfaces, the optical body reflecting and refracting portions of the single incident light beam to generate the pair of incident light beams.

16. The optical system of claim 11, wherein the reflected light beams are separated by a path spacing when exiting the lens, the optical system further comprising a beam combiner that is positioned to modify the reflected light beams so that the path spacing is re-scaled.

17. The optical system of claim 11, wherein the incident light beams are reflected by the object at multiple points along the optical axis, the optical system further comprising a range limiter, the range limiter filtering the reflected light beams so that the phases of a predetermined pair of reflected light beams are detected.

18. The optical system of claim 11, wherein the object holder and the lens are configured to move relative to each other such that the object moves in a lateral direction with respect to the lens, the phase detectors configured to detect the phases of the reflected light beams as the object is moving in the lateral direction.

19. The optical system of claim 11, further comprising an actuator for movement of at least one of the lens and the object to adjust a relative position of the lens and the object with respect to each other.

20. The optical system of claim 19, wherein the focus control module is operatively connected to the actuator to direct the movement.

* * * * *